(12) United States Patent
Bauer et al.

(10) Patent No.: US 11,554,708 B2
(45) Date of Patent: Jan. 17, 2023

(54) COMPOSITE REFRIGERATED TRUCK BODY AND METHOD OF MAKING THE SAME

(71) Applicant: Wabash National, L.P., Lafayette, IN (US)

(72) Inventors: Jeffrie Scott Bauer, Oxford, IN (US); Scott A. Storz, Lafayette, IN (US); Andrzej Wylezinski, Lafayette, IN (US); Michael L. Thoma, Lafayette, IN (US)

(73) Assignee: Wabash National, L.P., Lafayette, IN (US)

( * ) Notice: Subject to any disclaimer, the term of this patent is extended or adjusted under 35 U.S.C. 154(b) by 347 days.

(21) Appl. No.: 16/788,889

(22) Filed: Feb. 12, 2020

(65) Prior Publication Data

US 2020/0180497 A1 Jun. 11, 2020

Related U.S. Application Data

(63) Continuation of application No. 15/550,366, filed as application No. PCT/US2016/019100 on Feb. 23, 2016, now Pat. No. 10,596,950.

(60) Provisional application No. 62/245,227, filed on Oct. 22, 2015, provisional application No. 62/235,166, filed on Sep. 30, 2015, provisional application No. 62/119,460, filed on Feb. 23, 2015.

(51) Int. Cl.
| | | |
|---|---|---|
| B62D 27/02 | (2006.01) |
| B62D 65/02 | (2006.01) |
| B60P 3/20 | (2006.01) |
| B62D 29/04 | (2006.01) |
| B62D 33/04 | (2006.01) |

(52) U.S. Cl.
CPC .............. *B60P 3/20* (2013.01); *B62D 27/026* (2013.01); *B62D 29/045* (2013.01); *B62D 33/046* (2013.01); *B62D 33/048* (2013.01); *B62D 65/02* (2013.01)

(58) Field of Classification Search
CPC ....... B60P 3/20; B62D 27/026; B62D 29/045; B62D 33/046; B62D 33/048; B62D 65/02
USPC ........................................ 180/89.1; 296/24.3
See application file for complete search history.

(56) References Cited

U.S. PATENT DOCUMENTS

| | | |
|---|---|---|
| 3,557,992 A | 1/1971 | Reeves |
| 3,637,252 A | 1/1972 | Metsker |
| 3,910,624 A | 10/1975 | Becker |
| 4,239,276 A | 12/1980 | Bertolini |

(Continued)

FOREIGN PATENT DOCUMENTS

| | | |
|---|---|---|
| AU | 07132/60 B2 | 11/1999 |
| CA | 1329818 C | 5/1994 |

(Continued)

OTHER PUBLICATIONS

Black, Sara, "Structural adhesives, Part I: Industrial," CompositesWorld, posted Apr. 11, 2016, 7 pages.

(Continued)

*Primary Examiner* — Hilary L Gutman
(74) *Attorney, Agent, or Firm* — Faegre Drinker Biddle & Reath LLP

(57) ABSTRACT

A vehicle is disclosed having a composite cargo body assembled in a manner that may improve thermal efficiency, fuel efficiency, and costs of manufacturing.

20 Claims, 26 Drawing Sheets

(56) References Cited

U.S. PATENT DOCUMENTS

| | | | |
|---|---|---|---|
| 4,418,507 A | 12/1983 | Roberts et al. | |
| 4,685,720 A | 8/1987 | Oren et al. | |
| 4,758,299 A | 7/1988 | Burke | |
| 4,976,490 A | 12/1990 | Gentle | |
| 5,143,418 A * | 9/1992 | Fouquet | B62D 25/2054 52/177 |
| 5,403,063 A | 4/1995 | Sjostedt et al. | |
| 5,429,066 A | 7/1995 | Lewit et al. | |
| 5,507,405 A | 4/1996 | Thomas et al. | |
| 5,562,981 A | 10/1996 | Ehrlich | |
| 5,664,518 A | 9/1997 | Lewit et al. | |
| 5,700,118 A | 12/1997 | Benneii et al. | |
| 5,765,639 A | 6/1998 | Muth | |
| 5,772,276 A | 6/1998 | Fetz et al. | |
| 5,800,749 A | 9/1998 | Lewit et al. | |
| 5,802,984 A | 9/1998 | Thoman et al. | |
| 5,830,308 A | 11/1998 | Reichard | |
| 5,860,668 A | 1/1999 | Hull et al. | |
| 5,860,693 A | 1/1999 | Ehrlich | |
| 5,890,435 A | 4/1999 | Thoman et al. | |
| 5,897,818 A | 4/1999 | Lewit et al. | |
| 5,908,591 A | 6/1999 | Lewit et al. | |
| 5,916,093 A | 6/1999 | Fecko et al. | |
| 5,979,684 A | 11/1999 | Ohnishi et al. | |
| 5,992,117 A | 11/1999 | Schmidt | |
| 6,004,492 A | 12/1999 | Lewit et al. | |
| 6,013,213 A | 1/2000 | Lewit et al. | |
| 6,076,693 A | 6/2000 | Reiter et al. | |
| 6,082,810 A | 7/2000 | Bennett | |
| 6,092,472 A | 7/2000 | Thoman et al. | |
| 6,199,939 B1 | 3/2001 | Ehrlich | |
| 6,206,669 B1 | 3/2001 | Lewit et al. | |
| 6,220,651 B1 | 4/2001 | Ehrlich | |
| 6,227,125 B1 | 5/2001 | Schroeder et al. | |
| 6,247,747 B1 | 6/2001 | Kawanomoto et al. | |
| 6,318,794 B1 | 11/2001 | Berube | |
| 6,349,988 B1 | 2/2002 | Foster et al. | |
| 6,374,546 B1 | 4/2002 | Fecko et al. | |
| 6,496,190 B1 | 12/2002 | Driemeyer et al. | |
| 6,497,190 B1 | 12/2002 | Lewit | |
| 6,505,883 B1 | 1/2003 | Ehrlich | |
| 6,543,469 B2 | 4/2003 | Lewit et al. | |
| 6,615,741 B2 | 9/2003 | Fecko et al. | |
| 6,626,622 B2 | 9/2003 | Zubko | |
| 6,688,835 B1 | 2/2004 | Buher | |
| 6,723,273 B2 | 4/2004 | Johnson et al. | |
| 6,740,381 B2 | 5/2004 | Day et al. | |
| 6,745,470 B2 | 6/2004 | Foster et al. | |
| 6,755,998 B1 | 6/2004 | Reichard et al. | |
| 6,761,840 B2 | 7/2004 | Fecko et al. | |
| 6,824,341 B2 | 11/2004 | Ehrlich | |
| 6,843,525 B2 | 1/2005 | Preisler | |
| 6,854,791 B1 | 2/2005 | Jaggi | |
| 6,863,339 B2 | 3/2005 | Boehm et al. | |
| 6,869,561 B2 | 3/2005 | Johnson et al. | |
| 6,877,940 B2 | 4/2005 | Nelson et al. | |
| 6,893,075 B2 | 5/2005 | Fenton et al. | |
| 6,911,252 B2 | 6/2005 | Lewit et al. | |
| 6,986,546 B2 | 1/2006 | Ehrlich | |
| 7,000,978 B1 | 2/2006 | Messano | |
| 7,025,166 B2 | 4/2006 | Thomas | |
| 7,025,408 B2 | 4/2006 | Jones et al. | |
| 7,069,702 B2 | 7/2006 | Ehrlich | |
| 7,134,820 B2 | 11/2006 | Ehrlich | |
| 7,182,396 B2 | 2/2007 | Taylor | |
| 7,219,952 B2 | 5/2007 | Taylor | |
| 7,264,305 B2 | 9/2007 | Kuriakose | |
| 7,353,960 B2 | 4/2008 | Seiter | |
| 7,407,216 B2 | 8/2008 | Taylor | |
| 7,434,520 B2 | 10/2008 | Zupancich et al. | |
| 7,451,995 B2 | 11/2008 | Bloodworth et al. | |
| 7,461,888 B2 | 12/2008 | Brown | |
| 7,517,005 B2 | 4/2009 | Kuriakose | |
| 7,575,264 B1 | 8/2009 | Solomon | |
| 7,578,534 B2 | 8/2009 | Wuerfel, III | |
| 7,578,541 B2 | 8/2009 | Layfield et al. | |
| 7,587,984 B2 | 9/2009 | Zupancich et al. | |
| 7,588,286 B2 | 9/2009 | Lewallen et al. | |
| 7,594,474 B2 | 9/2009 | Zupancich | |
| 7,608,313 B2 | 10/2009 | Solomon et al. | |
| 7,621,589 B1 | 11/2009 | Gerome | |
| 7,704,026 B2 | 4/2010 | Roush et al. | |
| 7,722,112 B2 | 5/2010 | Ehrlich | |
| 7,748,172 B2 | 7/2010 | Zupancich et al. | |
| 7,762,618 B2 | 7/2010 | Lewallen et al. | |
| 7,790,076 B2 | 9/2010 | Seiter et al. | |
| 7,829,165 B2 | 11/2010 | Grandominico et al. | |
| 7,887,120 B2 | 2/2011 | Boivin et al. | |
| 7,901,537 B2 | 3/2011 | Jones et al. | |
| 7,905,072 B2 | 3/2011 | Verhaeghe | |
| 7,914,034 B2 | 3/2011 | Roush | |
| 7,931,328 B2 | 4/2011 | Lewallen et al. | |
| 8,016,322 B2 | 9/2011 | Keehan | |
| 8,056,960 B2 | 11/2011 | Brown | |
| 8,186,747 B2 | 5/2012 | Bloodworth et al. | |
| 8,263,217 B2 | 9/2012 | Verhaeghe | |
| 8,342,588 B2 | 1/2013 | Skaradzinski | |
| 8,448,989 B2 | 5/2013 | Verhaeghe | |
| 8,474,871 B1 | 7/2013 | Ludwick | |
| 8,696,048 B2 | 4/2014 | Griffin et al. | |
| 8,757,704 B2 | 6/2014 | Zhao et al. | |
| 8,814,255 B2 | 8/2014 | Yamaji et al. | |
| 8,876,193 B2 | 11/2014 | Kunkel et al. | |
| 8,950,144 B2 | 2/2015 | Padmanabhan | |
| 9,051,014 B2 | 6/2015 | Lookebill et al. | |
| 9,138,943 B2 | 9/2015 | Weinberg et al. | |
| 9,138,974 B2 | 9/2015 | Weinberg et al. | |
| 9,138,975 B2 | 9/2015 | Weinberg et al. | |
| 9,174,656 B2 | 11/2015 | Heitmeyer et al. | |
| 9,199,440 B2 | 12/2015 | Weinberg et al. | |
| 9,205,635 B2 | 12/2015 | Weinberg et al. | |
| 9,260,117 B2 | 2/2016 | Vande Sande | |
| 9,317,468 B2 | 4/2016 | Liebald et al. | |
| 9,339,987 B2 | 5/2016 | Weinberg et al. | |
| 9,409,607 B2 | 8/2016 | Osten | |
| 9,434,421 B1 | 9/2016 | Lu et al. | |
| 9,499,203 B1 | 11/2016 | Finley | |
| 9,566,769 B2 | 2/2017 | Weinberg et al. | |
| 9,604,677 B2 | 3/2017 | McKinney et al. | |
| 9,650,003 B2 | 5/2017 | Owens et al. | |
| 9,708,009 B2 | 7/2017 | Vance | |
| 9,738,050 B2 | 8/2017 | Lee et al. | |
| 9,744,753 B2 | 8/2017 | Sheffield et al. | |
| 9,815,501 B2 | 11/2017 | McCormack et al. | |
| 9,827,750 B2 | 11/2017 | Lookebill et al. | |
| 9,828,164 B2 | 11/2017 | Denson | |
| 9,878,744 B2 | 1/2018 | Lu et al. | |
| 9,884,660 B2 | 2/2018 | Fenton | |
| 9,884,661 B2 | 2/2018 | Fenton | |
| 9,889,637 B2 | 2/2018 | Weinberg et al. | |
| 10,407,103 B2 | 9/2019 | Hatke | |
| 2001/0011832 A1 | 8/2001 | Ehrlich et al. | |
| 2005/0194381 A1 | 9/2005 | Zupancich et al. | |
| 2005/0241253 A1 | 11/2005 | Song et al. | |
| 2006/0065152 A1 | 3/2006 | Heitmeyer et al. | |
| 2006/0108361 A1 | 5/2006 | Seiter | |
| 2006/0121244 A1 | 6/2006 | Godwin et al. | |
| 2006/0123725 A1 | 6/2006 | Godwin | |
| 2006/0158005 A1 | 7/2006 | Brown | |
| 2006/0179733 A1 | 8/2006 | Padmanabhan | |
| 2006/0201081 A1 | 9/2006 | Godwin | |
| 2006/0219129 A1 | 10/2006 | Jarvis | |
| 2007/0119850 A1 | 5/2007 | Seiter | |
| 2007/0132278 A1 | 6/2007 | Lester et al. | |
| 2007/0160793 A1 | 7/2007 | Cageao et al. | |
| 2007/0194602 A1 | 8/2007 | Ehrlich | |
| 2007/0216197 A1 | 9/2007 | Wuerfel, III | |
| 2007/0250025 A1 | 10/2007 | Sams et al. | |
| 2008/0238180 A1 | 10/2008 | Kraenzle | |
| 2008/0290057 A1 | 11/2008 | Zupancich et al. | |
| 2009/0126600 A1 | 5/2009 | Zupancich et al. | |
| 2009/0278386 A1 | 11/2009 | Ehrlich | |
| 2010/0019536 A1 | 1/2010 | Bloodworth et al. | |
| 2010/0101876 A1 | 4/2010 | Misencik | |

(56) References Cited

U.S. PATENT DOCUMENTS

| | | |
|---|---|---|
| 2010/0109309 A1 | 5/2010 | Kootstra |
| 2011/0095574 A1 | 4/2011 | Brown |
| 2011/0204611 A1 | 8/2011 | Ziegler et al. |
| 2013/0207413 A1 | 8/2013 | Lookebill et al. |
| 2014/0199551 A1 | 7/2014 | Lewit |
| 2014/0262011 A1 | 9/2014 | Lewit et al. |
| 2014/0300134 A1 | 10/2014 | Gerst |
| 2015/0054311 A1 | 2/2015 | Marchesano et al. |
| 2015/0076861 A1 | 3/2015 | Padmanabhan |
| 2015/0137560 A1 | 5/2015 | Preisler et al. |
| 2015/0158532 A1 | 6/2015 | Ayuzawa et al. |
| 2015/0203160 A1 | 7/2015 | Peterson et al. |
| 2017/0057561 A1 | 3/2017 | Fenton |
| 2017/0166263 A1 | 6/2017 | McKinney et al. |
| 2017/0210317 A1 | 7/2017 | Owens et al. |
| 2017/0240216 A1 | 8/2017 | Bauer et al. |
| 2017/0240217 A1 | 8/2017 | Storz et al. |
| 2017/0241134 A1 | 8/2017 | McCloud et al. |
| 2017/0247063 A1 | 8/2017 | Banerjee et al. |
| 2017/0282499 A1 | 10/2017 | Larocco |
| 2017/0334489 A1 | 11/2017 | Shin |
| 2018/0037151 A1 | 2/2018 | Bauer et al. |
| 2018/0057059 A1 | 3/2018 | Bauer et al. |
| 2018/0194405 A1 | 7/2018 | Hatke |

FOREIGN PATENT DOCUMENTS

| | | | |
|---|---|---|---|
| CA | 2181750 | A1 | 1/1997 |
| CA | 2199584 | A1 | 9/1997 |
| CA | 2253308 | A1 | 11/1997 |
| CA | 2551863 | A1 | 3/1998 |
| CA | 2219312 | A1 | 4/1998 |
| CA | 2242467 | A1 | 7/1999 |
| CA | 2261384 | A1 | 8/1999 |
| CA | 2265405 | A1 | 1/2000 |
| CA | 2275848 | A1 | 12/2000 |
| CA | 2382578 | A1 | 3/2001 |
| CA | 2455957 | A1 | 5/2004 |
| CA | 2768878 | A1 | 3/2005 |
| CA | 2811134 | A1 | 4/2006 |
| CA | 2529762 | A1 | 6/2006 |
| CA | 2650992 | A1 | 11/2006 |
| CA | 2528558 | A1 | 5/2007 |
| CA | 2565510 | A1 | 8/2007 |
| CA | 2604282 | A1 | 3/2008 |
| CA | 2689745 | A1 | 7/2009 |
| CA | 2689746 | A1 | 7/2009 |
| CA | 2689747 | A1 | 7/2009 |
| CA | 2689748 | A1 | 7/2009 |
| CA | 2689749 | A1 | 7/2009 |
| CA | 2689751 | A1 | 7/2009 |
| CA | 2797778 | A1 | 7/2009 |
| CA | 2802907 | A1 | 7/2009 |
| CA | 2788047 | A1 | 8/2011 |
| CA | 2763094 | A1 | 7/2012 |
| CA | 2807710 | A1 | 8/2013 |
| CA | 2848174 | A1 | 10/2014 |
| CA | 2894059 | A1 | 12/2015 |
| CA | 2977131 | A1 | 9/2016 |
| CA | 2958805 | A1 | 8/2017 |
| CA | 2958838 | A1 | 8/2017 |
| CA | 2958839 | A1 | 8/2017 |
| DE | 2617169 | A1 | 11/1977 |
| EP | 2660119 | A1 | 11/2013 |
| JP | 06-293233 | A | 10/1994 |

OTHER PUBLICATIONS

CMS North America, Inc., "Transportation: Refrigerated Semi-trailers, Trailers & Vans," available online at http://www.cmsna.com/13_transportation_refrigerated_semi_trailers_trailers_vans.php on or before Jul. 2, 2014, 2 pages.

Composite Marine Control Surface, installed on USS Pioneer (MCM 9), May 1997, 13 pages.

Composite Twisted Rudder, TCC Meeting 2008, handout, 32 pages.

Eric Green Associates.com, "Composite Rudders Take Shape for U.S. Navy" available online at http://www.ericgreeneassociates.com/Images/Composite_Twisted_Rudder.pdf, accessed as early as Jul. 13, 2014, 7 pages.

Expedition Portal, "Truck Camper Construction Costs?," available online at http://www.expeditionportal.com/forum/threads/12486-Truck-Camper-Constrnction-Costs at least as eariy as Jun. 18, 2015, 5 pages.

Griffiths, Bob, "Rudder Gets New Twist with Composites," CompositesWorld, posted Aug. 1, 2006, 4 pages.

International Preliminary Reporton Patentability received for PCT Patent Application No. PCT/US2016/019100, dated Jun. 8, 2017, 30 pages.

International Search Report and Written Opinion received for PCT Patent Application No. PCT/US2016/019100, dated May 9, 2016, 12 pages.

International Trucking Shows, "True Composites Platform Highlight of International Trucking Show," Aug. 1992, 1 page.

Johnson Truck Bodies, Blizzard Series brochure, accessed as early as Aug. 1, 2014, 8 pages.

Kedward, Keith and Whitney, James, Delaware Composites Design Encyclopedia, "Design Studies," vol. 5, 1990, preview version available at https://books.google.com/books?id-9-KYOm81MWEC&printsec=frontcover#v-onepage&q&f=false, 17 pages.

Lightweight Structures B.V., "ColdFeather: lightweight composite isothermal trailer," available online at http://www.lightweight-structures.com/coldfeather-lightweight-composite-isothermal-trailer/index.html at least as early as Jun. 18, 2015, 6 pages.

Morey, Bruce, "Advanced Technologies Supplement: Processes Reduce Composite Costs," Advanced Manufacturing, posted Apr. 1, 2007, 7 pages.

NetCompositesNow.com, "Twisted Composites Rudders," available online at http://www.netcomposites.com/news/twisted-composites-rudders/3202 as early as Aug. 11, 2005, 3 pages.

North American Composites, Virtual Engineered Composites (VEC) Article, available online at http://www.nacomposites.com/delivering-performance/page.asp?issueid=7&page=cover, Fall 2006, 4 pages.

Reichard, Dr. Ronnal P., "Composites in Theme Parks: From the perspective of a contractor—trouble shooter-enthusiast!" presented at Florida Institute of Technology at least as early as 1999, 37 pages.

Scott Bader Group Companies, Crystic, "Composites Handbook", copyright Dec. 2005, 100 pages.

Seaver, Mark and Trickey, Stephen, "Underwater Blast Loading of a Composite Twisted Rudder with FBGS," dated Apr. 14, 2008, 19th International Conference on Optical Fibre Sensors, 2 pages.

Trailer/Body Builders, "More Emphasis on Less Weight," available at http://trailer-bodybuilders.com/trailers/more-emphasis-less-weight, May 1, 2008, 5 pages.

Zweben, Carl, Handbook of Materials Selection, "Chapter 12: Composite Materials," 2002, preview version available at https://books.google.com/books?id-gWg-rchM700C&printsec=frontcover#tv-onepage&q&f=false, 47 pages.

\* cited by examiner

COMPOSITE REFRIGERATED TRUCK BODY AND METHOD OF MAKING THE SAME

CROSS-REFERENCE TO RELATED APPLICATIONS

This application is a continuation of U.S. patent application Ser. No. 15/550,366, filed Aug. 10, 2017, which is a U.S. national stage application of International Patent Application No. PCT/2016/019100, filed Feb. 23, 2016, which claims priority to the following U.S. Provisional Patent Applications, the disclosures of which are hereby expressly incorporated by reference herein in their entirety:

| application Ser. No. | Filing Date |
| --- | --- |
| 62/119,460 | Feb. 23, 2015 |
| 62/235,166 | Sep. 30, 2015 |
| 62/245,227 | Oct. 22, 2015 |

FIELD OF THE DISCLOSURE

The present disclosure relates generally to cargo vehicles and methods of making the same. More particularly, the present disclosure relates to vehicles having composite cargo bodies and methods of making the same.

BACKGROUND OF THE DISCLOSURE

Vehicles having cargo bodies are used in the transportation industry for transporting many different types of cargo. Certain cargo bodies may be refrigerated and insulated to transport temperature-sensitive cargo. The use of metal components within the floor, roof, sidewalls, and/or nose of the cargo body may contribute to heat loss from the interior of the cargo body.

SUMMARY OF THE DISCLOSURE

A vehicle is disclosed having a composite cargo body assembled in a manner that may improve thermal efficiency, fuel efficiency, and costs of manufacturing.

According to an exemplary embodiment of the present disclosure, a cargo body for a vehicle is disclosed. The cargo body includes a composite floor having an upper surface, a lower surface, a right longitudinal support beam that extends from the lower surface, wherein the right longitudinal support beam is made from a composite material, and a left longitudinal support beam that extends from the lower surface, wherein the left longitudinal support beam is made from a composite material. The cargo body also includes a composite roof, a composite right sidewall coupled to the floor and the roof, a composite left sidewall coupled to the floor and the roof, and a composite nose coupled to the floor, the roof, the right sidewall, and the left sidewall.

In certain embodiments, the right sidewall is adhesively bonded to the floor and the roof, the left sidewall is adhesively bonded to the floor and the roof, and the nose is adhesively bonded to the floor, the roof, the right sidewall, and the left sidewall.

In certain embodiments, each of the floor, the roof, the right sidewall, the left sidewall, and the nose is made from a fiber-reinforced plastic material.

In certain embodiments, the floor is a single molded component, the roof is a single molded component, the right sidewall is a single molded component, the left sidewall is a single molded component, and the nose is a single molded component distinct from the floor.

In certain embodiments, the cargo body further includes a side door opening in one of the sidewalls, and a side door frame positioned around the side door opening and configured to receive a side door, the side door frame including an exterior portion adhesively bonded to an exterior surface of the corresponding sidewall and an interior portion adhesively bonded to an interior surface of the corresponding sidewall.

In certain embodiments, the corresponding sidewall includes at least one support beam positioned between the exterior portion and the interior portion of the side door frame.

In certain embodiments, the at least one support beam is positioned between a terminal end of the exterior portion and a terminal end of the interior portion of the side door frame.

In certain embodiments, the cargo body further includes an opening in the nose configured to receive a thermal control unit, and a plurality of connectors adhesively bonded to the nose and mechanically fastened to the thermal control unit.

In certain embodiments, the nose includes at least one of a left vertical support beam that forms a left vertical edge of the opening, a right vertical support beam that forms a right vertical edge of the opening, an upper horizontal support beam that forms an upper horizontal edge of the opening, and a lower horizontal support beam that forms a lower horizontal edge of the opening.

In certain embodiments, the plurality of connectors includes an L-shaped connector that is adhesively bonded to both the nose and the roof.

In certain embodiments, the vehicle includes a motorized truck, a chassis including a right rail and a left rail, and a plurality of traction devices coupled to the chassis and powered by the motorized truck.

In certain embodiments, the floor includes a composite right support beam coupled to the right rail of the chassis via a plurality of right connector assemblies, wherein each right connector assembly is adhesively bonded to the right support beam of the floor and coupled to the right rail of the chassis, and a composite left support beam coupled to the left rail of the chassis via a plurality of left connector assemblies, wherein each left connector assembly is adhesively bonded to the left support beam of the floor and coupled to the left rail of the chassis.

In certain embodiments, each connector assembly includes an upper connector adhesively bonded to the corresponding support beam of the floor, and a lower connector positioned below the corresponding rail of the chassis and mechanically fastened to the upper connector.

In certain embodiments, each connector assembly further comprises a first fastener and a second fastener, the first and second fasteners extending vertically between the upper and lower connectors on either side of the corresponding rail.

In certain embodiments, each connector assembly further comprises an intermediate connector positioned between the corresponding support beam of the floor and the corresponding rail of the chassis, the intermediate connector being mechanically fastened to the upper and lower connectors.

According to another exemplary embodiment of the present disclosure, a cargo body for a vehicle is disclosed, the cargo body including a floor, a roof, a right sidewall adhesively bonded to the floor and the roof, a left sidewall adhesively bonded to the floor and the roof, and a nose adhesively bonded to the floor, the roof, the right sidewall, and the left sidewall, wherein each of the floor, the roof, the right sidewall, the left sidewall, and the nose is made from a composite material.

In certain embodiments, the cargo body further includes a rear door assembly including a rear frame, a rear right connector adhesively bonded to the right sidewall and coupled to the rear frame, a rear left connector adhesively bonded to the left sidewall and coupled to the rear frame, and an upper rear connector adhesively bonded to the roof and coupled to the rear frame, wherein each of the rear right and rear left connectors extends vertically along a height of the cargo body, and the upper rear connector extends horizontally along a width of the cargo body.

In certain embodiments, each of the rear right, rear left, and upper rear connectors is a flat plate.

In certain embodiments, each of the rear right, rear left, and upper rear connectors is mechanically fastened to the rear frame.

In certain embodiments, the cargo body further includes a lower right connector adhesively bonded to the floor and the right sidewall, a lower left connector adhesively bonded to the floor and the left sidewall, an upper right connector adhesively bonded to the roof and the right sidewall, and an upper left connector adhesively bonded to the roof and the left sidewall, wherein each of the lower right, lower left, upper right, and upper left connectors extends horizontally along a length of the cargo body.

In certain embodiments, each of the lower right, lower left, upper right, and upper left connectors is an L-bracket.

In certain embodiments, the cargo body further includes at least one of an upper right conduit at least partially defined by the upper right connector, and an upper left conduit at least partially defined by the upper left connector.

In certain embodiments, the cargo body further includes a lower front connector adhesively bonded to the floor and the nose, and an upper front connector adhesively bonded to the roof and the nose, wherein each of the lower front and upper front connectors extends horizontally along a width of the cargo body.

In certain embodiments, the lower front connector is a flat plate, and the upper front connector is an L-bracket.

In certain embodiments, the cargo body further includes a front right connector adhesively bonded to the right sidewall and the nose, and a front left connector adhesively bonded to the left sidewall and the nose, wherein each of the front right and front left connectors extends vertically along a height of the cargo body.

In certain embodiments, each of the front right and front left connectors is a rounded L-bracket.

In certain embodiments, the floor is in direct contact with the right sidewall, the left sidewall, and the nose, and the roof is in direct contact with the right sidewall, the left sidewall, and the nose.

In certain embodiments, the composite material is a fiber-reinforced plastic.

According to another exemplary embodiment of the present disclosure, a method is disclosed for manufacturing a vehicle including a cargo body, the method including: providing a floor, a roof, a right sidewall, a left sidewall, and a nose each made from a composite material; bonding the right sidewall to the floor and the roof; bonding the left sidewall to the floor and the roof; and bonding the nose to the floor, the roof, the right sidewall, and the left sidewall.

In certain embodiments, the method further includes connecting a side door to the cargo body by: bonding a side door frame to at least one of the sidewalls; and coupling the side door to the side door frame.

In certain embodiments, the method further includes connecting a thermal control unit to the cargo body by: bonding a front connector to the nose; and mechanically fastening the thermal control unit to the front connector.

In certain embodiments, the method further includes connecting a rear door assembly to the cargo body by: bonding a rear connector to the cargo body; and mechanically fastening the rear connector to the rear door assembly.

In certain embodiments, the method further includes connecting the cargo body to a chassis by: bonding a connector to a longitudinal support beam of the floor; and mechanically fastening the connector to the chassis.

Additional features and advantages of the present invention will become apparent to those skilled in the art upon consideration of the following detailed description of the illustrative embodiments exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

Figure 1:
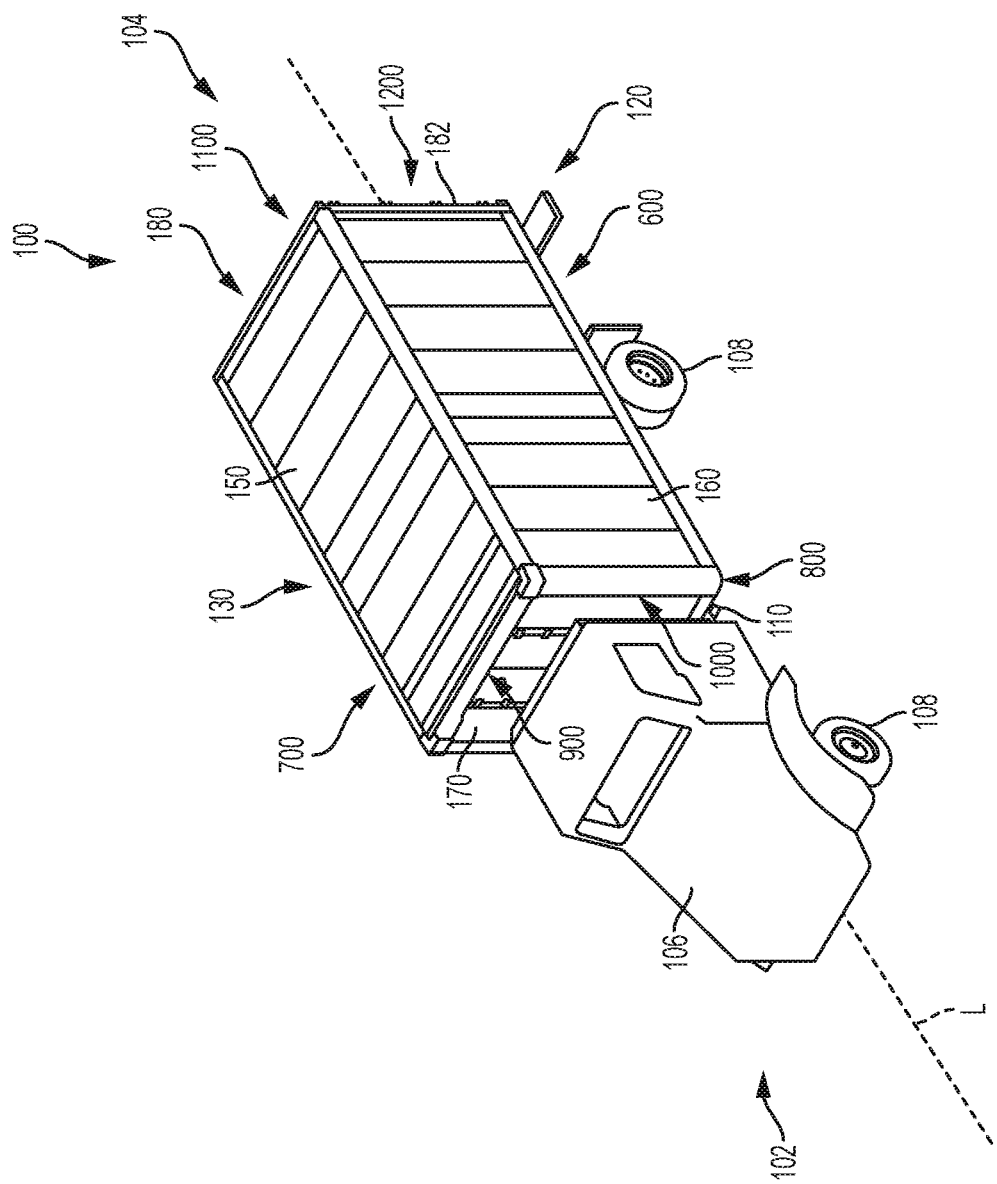
FIG. 1 is a perspective view of a cargo vehicle including a motorized truck, a chassis, a plurality of wheels, a bumper assembly, and a cargo body, the cargo body including a floor, a roof, a right sidewall, a left sidewall, a nose, and a rear door assembly having a rear frame.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

1. Cargo Vehicle

Figure 2:
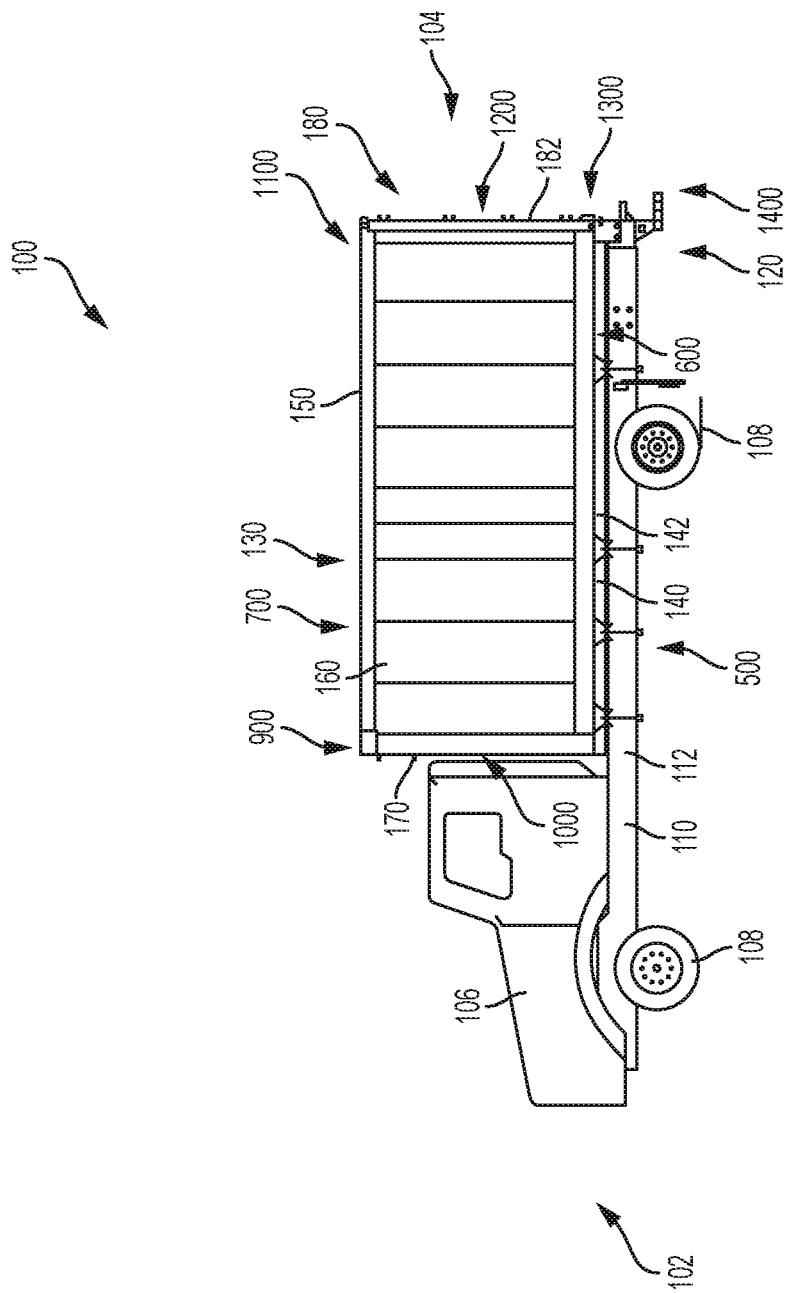
FIG. 2 is a side elevational view of the cargo vehicle of FIG. 1.

Referring initially to FIGS. 1 and 2, a cargo vehicle 100 is shown for supporting and transporting cargo. The illustrative straight frame vehicle 100 extends along a longitudinal axis L from a front end 102 to a rear end 104 and includes a motorized truck 106 that powers a plurality of wheels 108 or other traction devices. The illustrative vehicle 100 also includes a chassis 110 having right and left longitudinal rails 112. The illustrative vehicle 100 further includes a bumper assembly 120. The illustrative vehicle 100 still further includes a cargo body 130 including a floor 140 for supporting cargo, a roof 150, right and left sidewalls 160, a front wall or nose 170, and a rear door assembly 180 having a rear frame 182 and a door (not shown) to access the cargo body 130.

In the illustrated embodiment of FIGS. 1 and 2, cargo body 130 is an enclosed body that is supported atop chassis 110. Cargo body 130 may be refrigerated and/or insulated to transport temperature-sensitive cargo. While the concepts of this disclosure are described in relation to a refrigerated truck body, it will be understood that they are equally applicable to other vehicles generally, and more specifically to conventional trailers (e.g., dry freight trailers, flatbed trailers, commercial trailers, small personal trailers) and/or box or van semi-trailers, and the like. Accordingly, those skilled in the art will appreciate that the present invention may be implemented in a number of different applications and embodiments and is not specifically limited in its application to the particular embodiments depicted herein.

2. Composite Materials

The cargo body 130 may be constructed, at least in part, of composite materials. For example, the floor 140, roof 150, right and left sidewalls 160, and/or nose 170 of the cargo body 130 may be constructed of composite materials. As such, the cargo body 130, as well as the floor 140, roof 150, right and left sidewalls 160, and/or nose 170 of the cargo body 130, may be referred to herein as composite structures. These composite structures may lack internal metal components. Also, each composite structure may be a single, unitary component, which may be formed from a plurality of layers permanently coupled together. Other elements of the cargo body 130 may be constructed of non-composite (e.g., metallic) materials. For example, the rear frame 182 of the cargo body 130 may be constructed of metallic materials.

The composite construction of the cargo body 130 may present certain advantages. First, because the composite structures may lack internal metal components, the composite cargo body 130 may have a reduced heat loss coefficient (Ua) and improved thermal efficiency. Also, the composite cargo body 130 may operate to minimize outgassing of blowing agents, minimize air loss, and minimize water intrusion. Additionally, the composite cargo body 130 may be lighter in weight than a typical metallic cargo body, which may improve fuel efficiency. Further, the composite cargo body 130 may have fewer metallic structures than a typical cargo body, which may make the cargo body 130 less susceptible to corrosion. Also, the composite cargo body 130 may include fewer parts than a typical metallic cargo body, which may simplify construction, reduce inventory, and reduce variation in manufacturing. Further, the composite cargo body 130 may be suitable for use with sensitive cargo, including foodstuffs, because the composite materials may be inert to avoid reacting with the cargo and other materials and because the composite materials may be easy to clean and maintain to ensure proper hygiene. As a result, the composite cargo body 130 may qualify as "food grade" equipment.

Composite materials are generally formed by combining two or more different constituents that remain separate and distinct in the final composite material. Exemplary composite materials include fiber-reinforced plastics. Such materials may be formed from an extruded preform assembly of a woven or stitched fiberglass cloth, a non-woven spun bond polymeric material, and a foam core (not shown). These preforms may be cut to size, combined in a mold resembling the final shape with other fiberglass and resin layers, and wetted with at least one resin and a catalyst to define a single structure during a curing process. The spun bond polymeric material may be mechanically stitched to the fiberglass cloth and/or the foam before the preforms are wetted with resin. In one embodiment, the spun bond material may be a polyester material, the foam may be a polyurethane material, and the resin may be a thermoset plastic resin matrix.

The individual preforms may be sized, shaped, and arranged in a manner that accommodates the strength requirements of the final structure. In areas of the final structure requiring less strength, the preforms may be relatively large in size, with the foam cores spanning relatively large distances before reaching the surrounding fiberglass and polymeric skins. By contrast, in areas of the final structure requiring more strength, the preforms may be relatively small in size, with the foam cores spanning relatively small distances before reaching the surrounding fiberglass and polymeric skins. For example, the preforms may be shaped as relatively wide panels in areas of the final structure requiring less strength and as relatively narrow support beams in areas of the final structure requiring more strength. Other exemplary techniques for strengthening such support beams include reinforcing the outer skins, such as by using uni-directional glass fibers or additional cloth in the outer skins, and/or reinforcing the inner cores, such as by using hard plastic blocks or higher density foam in the inner cores.

After the curing process, a coating may be applied to the inner and/or outer surfaces of the cured preforms. Additionally, metallic or non-metallic sheets or panels may be applied to the inner and/or outer surfaces of the cured preforms, either in place of the coating or with the coating. The metallic sheets or panels may be comprised of stainless steel, aluminum, and/or coated carbon steel, and the non-metallic sheets or panels may be comprised of carbon fiber composites, for example.

Exemplary composite structures include DuraPlate® structures provided by Wabash National Corporation of Lafayette, Ind. and PRISMA® structures provided by Compsys, Inc. of Melbourne, Fla. Such composite structures may be manufactured using technology disclosed in the following patents and published patent applications, each of which is incorporated by reference in its entirety herein: U.S. Pat. Nos. 5,429,066, 5,800,749, 5,664,518, 5,897,818, 6,013,213, 6,004,492, 5,908,591, 6,497,190, 6,911,252, 5,830,308, 6,755,998, 6,496,190, 6,911,252, 6,723,273, 6,869,561, 8,474,871, 6,206,669, and 6,543,469, and U.S. Patent Application Publication Nos. 2014/0262011 and 2014/0199551.

3. Adhesive Bonding

Various connections or joints of the composite cargo body 130 may be assembled, at least in part, using adhesive bonding. The adhesive 300 may be a structural adhesive that is suitable for load-bearing applications. The adhesive 300 may have a lap shear strength greater than 1 MPa, 10 MPa, or more, for example. Exemplary adhesives 300 include, for example, epoxies, acrylics, urethanes (single and two part), polyurethanes, methyl methacrylates (MMA), cyanoacrylates, anaerobics, phenolics, and/or vinyl acetates. The adhesive 300 may be selected based on the needs of the particular application.

The method used to form an adhesive bond may also vary according to the needs of the particular application. First, the surfaces receiving the adhesive 300 (i.e., adherends) may be pre-treated, such as by abrading the surfaces, applying a primer, and/or cleaning the surfaces with a suitable cleaner (e.g., denatured alcohol). Second, the adhesive 300 may be applied to the surfaces over a predetermined application time (i.e., "open" time) and at a predetermined application temperature. In certain embodiments, the application temperature may be below the glass-transition temperature of the adhesive 300. Third, pressure may be applied to the surfaces, such as by using clamps, weights, vacuum bags, and/or ratchet straps, for example. Finally, the adhesive 300 may be allowed to solidify. Some adhesives 300 may undergo a chemical reaction in order to solidify, referred to as curing. This curing may occur over a predetermined cure time and at a predetermined cure temperature. In certain embodiments, the adhesive 300 may be heated during curing such that the cure temperature is higher than the application temperature.

Using adhesive bonding to assemble the composite cargo body 130 rather than mechanical fasteners may present certain advantages. First, the composite structures may not require holes for mechanical fasteners, so the structural integrity of the composite structures may be maintained. Also, the adhesive bond may be stronger than a connection using mechanical fasteners. In fact, the strength of the adhesive bond may exceed the strength of the composite structures themselves, so the composite structures may delaminate or otherwise fail before the adhesive 300 fails. Further, the elimination of mechanical fasteners may also provide improved aesthetics. Finally, the adhesive 300 may form a seal between the adherends, which may help fill intentional or unintentional spaces between the adherends and insulate the cargo body 130.

4. Connectors

Various connections of the composite cargo body 130 may be assembled using one or more connectors, which may include brackets, braces, plates, and combinations thereof, for example. The connectors may vary in size and shape. For example, suitable connectors may be L-shaped, C-shaped, T-shaped, pi-shaped, flat, or bent.

The connectors may be constructed of metallic materials (e.g., aluminum, titanium, or steel), polymeric materials, wood, or composite materials. In certain embodiments, the connectors are constructed of materials which are dissimilar from the composite material used to construct the composite cargo body 130. The connectors may be fabricated by extrusion, pultrusion, sheet forming and welding, roll forming, and/or casting, for example.

The connectors may be adhesively bonded to composite structures of the cargo body 130. For example, the connectors may be adhesively bonded to the composite floor 140, the composite roof 150, the composite right and left sidewalls 150, and/or the composite nose 170 of the cargo body 130. The connectors may be mechanically fastened to non-composite (e.g., metallic) structures of the cargo body 130. For example, the connectors may be mechanically fastened to the metallic rear frame 182 of the cargo body 130. Suitable mechanical fasteners include bolts, rivets, and screws, for example.

5. Connection Between Composite Floor and Metallic Chassis

Figure 3:
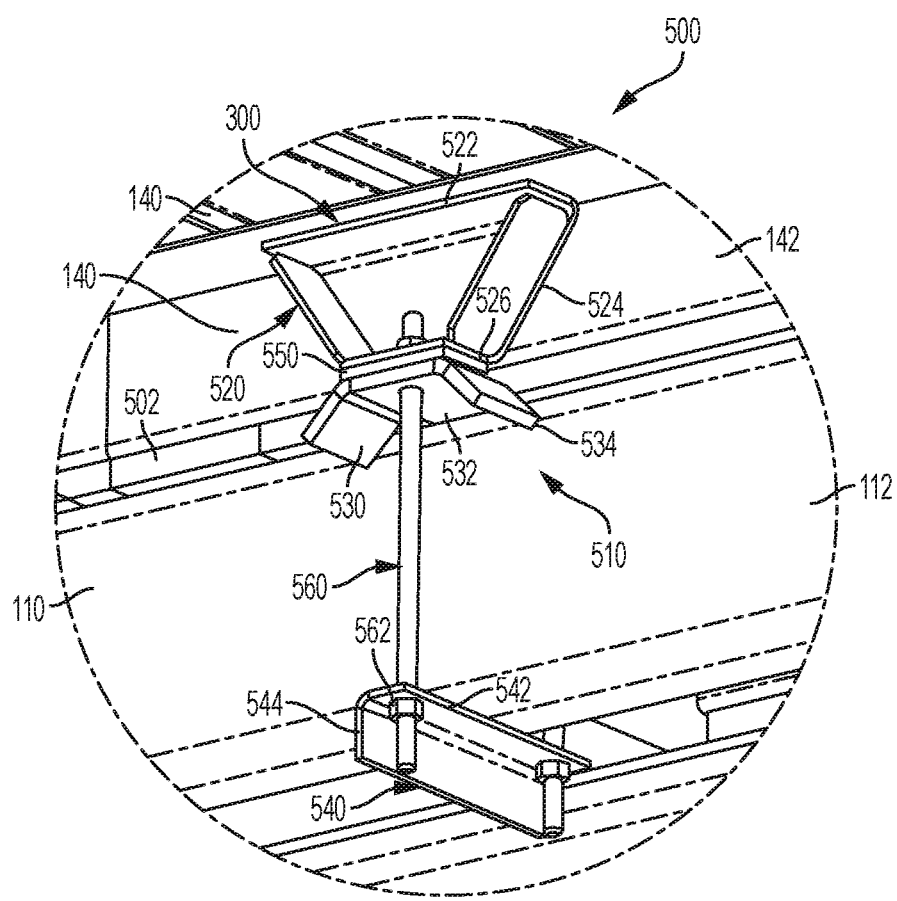
FIG. 3 is an assembled perspective view of a connection between the truck body and the chassis.
Figure 4:
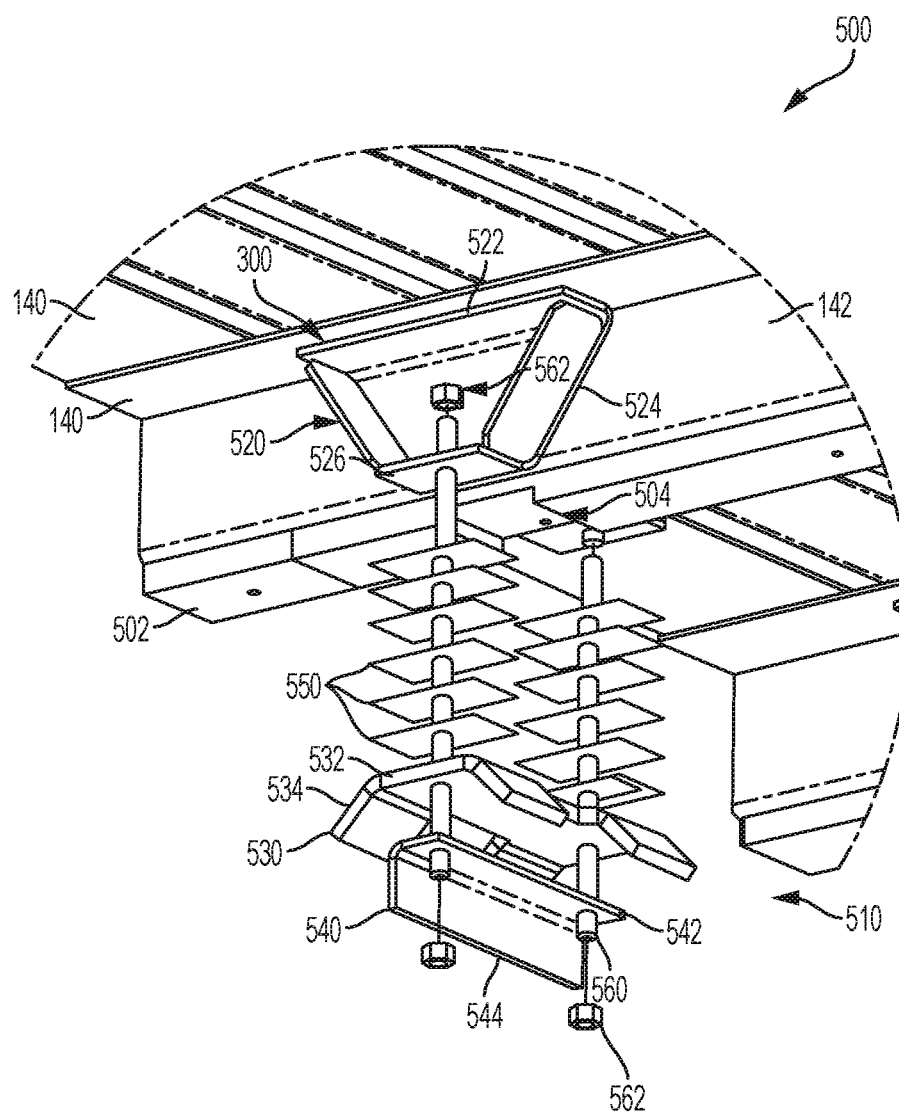
FIG. 4 is an exploded perspective view of the connection of FIG. 3.
Figure 5:
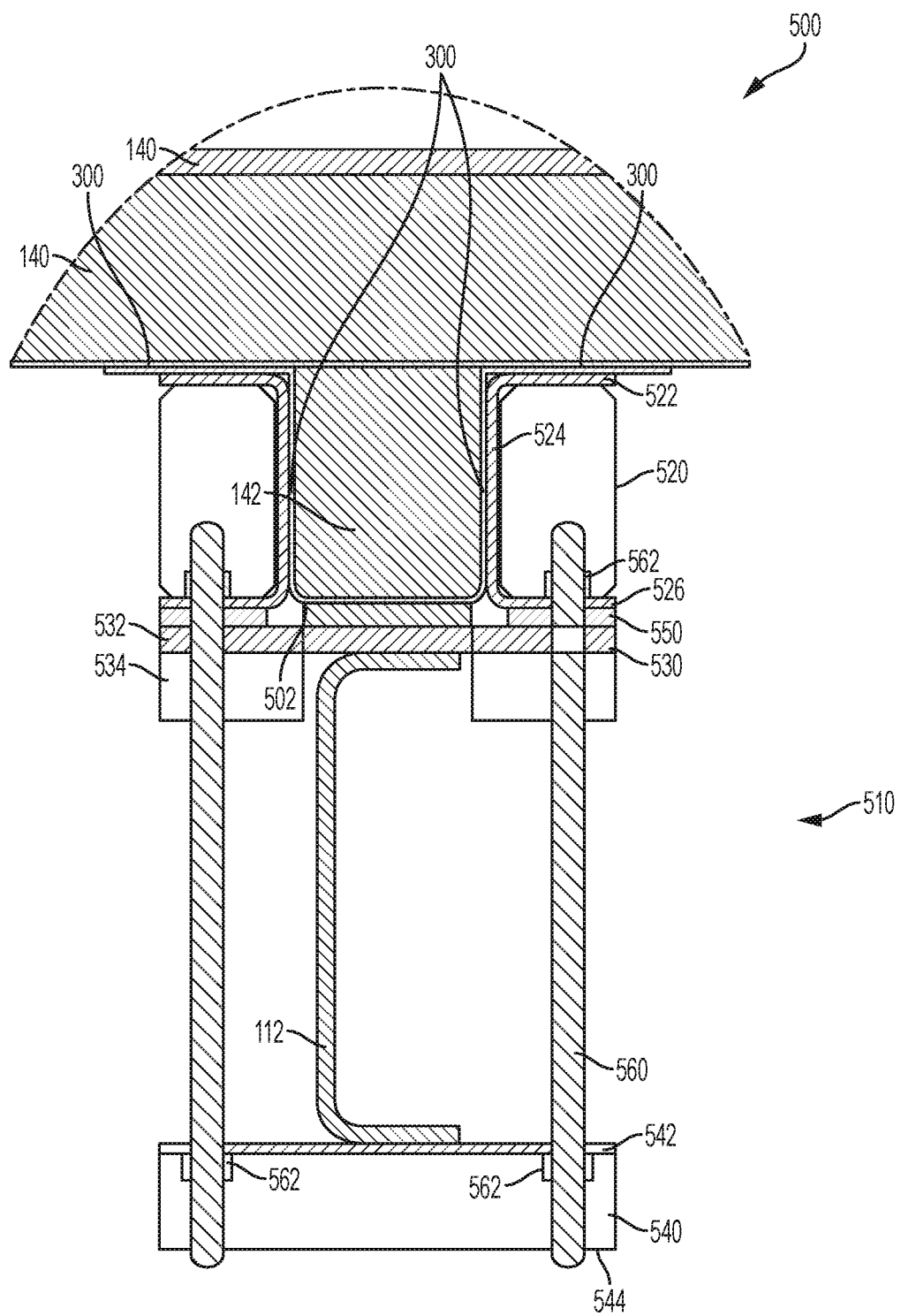
FIG. 5 is an assembled cross-sectional view of the connection of FIG. 3.

Referring next to FIGS. 3-5, a connection 500 is shown between the composite floor 140 of the cargo body 130 and the metallic chassis 110 of the straight frame vehicle 100. The composite floor 140 of the cargo body 130 includes an upper surface for supporting cargo, a lower surface, and right and left longitudinal support beams 142 extending downwardly from the lower surface. The support beams 142 may be composite structures that are relatively narrow and/or reinforced for additional strength, as discussed in Section 2 above. Together with the support beams 142, the composite floor 140 of the cargo body 130 is generally T-shaped in cross-section (FIG. 5). The chassis 110 includes corresponding right and left longitudinal rails 112, which may be metallic structures that are generally C-shaped in cross-section. Right and left spacers 502 having notches 504 (FIG. 4) may be provided between the support beams 142 of the composite floor 140 and the corresponding rails 112 of the chassis 110.

A plurality of connector assemblies 510 is provided along the length of vehicle 100 (FIG. 2) to form the connection 500 between the composite support beams 142 of the composite floor 140 and the corresponding rails 112 of the chassis 110. Advantageously, the connector assemblies 510 may reduce shear loads on the sides of the composite support beams 142 and also reduce compression loads on the bottom of the composite support beams 142.

As shown in FIGS. 3-5, each connector assembly 510 illustratively includes outer and inner upper connectors 520, an intermediate connector 530, and a lower connector 540. Each of the illustrative upper connectors 520 is generally C-shaped in cross-section (FIG. 5), having an upper horizontal portion 522, an intermediate vertical portion 524, and a lower horizontal portion 526. The upper connector 520 may narrow downwardly, such that the lower horizontal portion 526 of the upper connector 520 is shorter than the upper horizontal portion 522 of the upper connector 520. The illustrative intermediate connector 530 is generally butterfly-shaped, having a horizontal portion 532 and angled portions 534, as discussed further below. The illustrative lower connector 540 is generally L-shaped in cross-section, having a horizontal portion 542 and a vertical portion 544. However, as discussed in Section 4 above, the upper connectors 520, intermediate connector 530, and lower connector 540 may vary in size and shape. For example, rather than being L-shaped as shown in FIG. 4, the lower connector 540 may be C-shaped. Each connector assembly 510 also includes a plurality of shims 550 between the upper connectors 520 and the intermediate connector 530. Each connector assembly 510 further includes outer and inner fasteners, illustratively threaded rods 560 and nuts 562, for clamping the connector assembly 510 together.

To assemble the connector assembly 510, the upper connectors 520 may first be adhesively bonded to the composite support beam 142 of the composite floor 140. Specifically, portions 522, 524 of the upper connectors 520 may be adhesively bonded to the composite support beam 142 of the composite floor 140 using adhesive 300. Next, the composite support beam 142 of the composite floor 140 may be lowered onto the corresponding rail 112 of the chassis 110 with the spacer 502 and the intermediate connector 530 stacked therebetween. The horizontal portion 532 of the butterfly-shaped intermediate connector 530 may be sized and shaped to fit within the notch 504 of the spacer 502, and the angled portions 534 of the butterfly-shaped intermediate connector 530 may extend downwardly on either side of the rail 112 of the chassis 110 to prevent side-to-side movement of the cargo body 130 relative to the rail 112. Then, shims 550 may be inserted between the upper connectors 520 and the intermediate connector 530 to fill the spaces on either side of the spacer 502. Next, the lower connector 540 may be positioned beneath the rail 112 of the chassis 110. Finally, threaded rods 560 may be inserted vertically through aligned holes in portions 526 of the upper connectors 520, shims 550, portion 532 of the intermediate connector 530, and portion 542 of the lower connector 540 and held in place using nuts 562 to clamp the connector assembly 510 together on either side of the rail 112. When connector assembly 510 is clamped together in this manner, connection 500 is formed between the composite floor 140 of the cargo body 130 and the metallic chassis 110 of the straight frame vehicle 100. This connection 500 prevents the cargo body 130 from sliding off the chassis 110 when vehicle 100 is stopping, traveling, or parking on a hill, for example. This connection 500 also prevents the cargo body 130 from shifting side-to-side relative to the chassis 110 when vehicle 100 is turning, for example.

6. Connection Between Composite Sidewalls and Composite Floor

Figure 6:
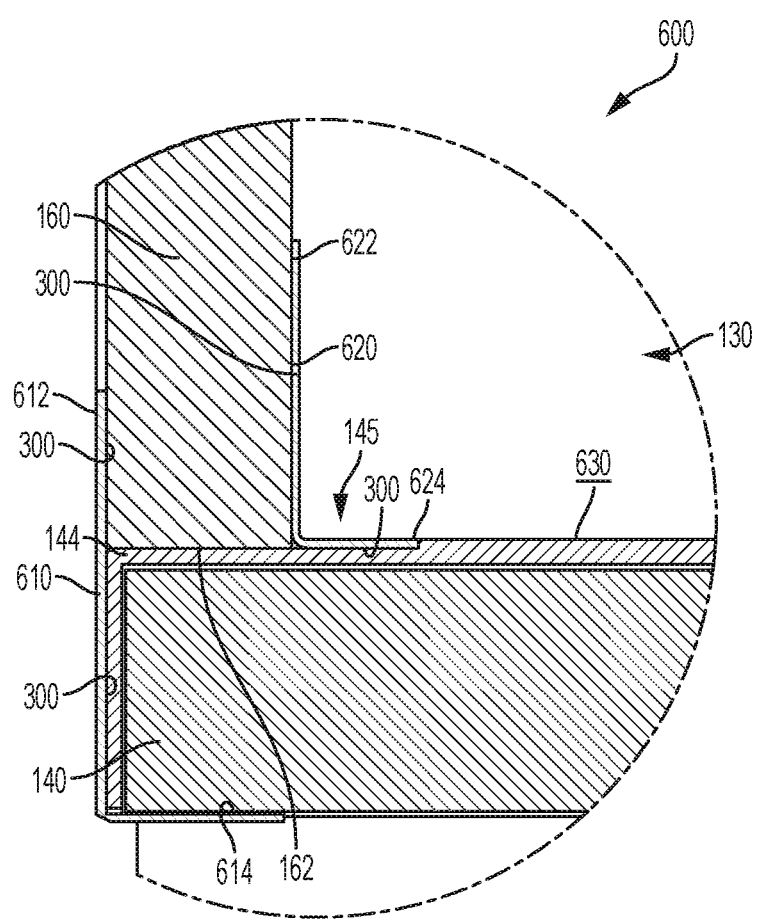
FIG. 6 is an assembled cross-sectional view of a connection between the sidewall and the floor.

Referring next to FIG. 6, a connection 600 is shown between the composite sidewall 160 and the composite floor 140. The lower end 162 of composite sidewall 160 may rest directly atop the outer edge 144 of the composite floor 140 to form a direct connection 600. It is also within the scope of the present disclosure to apply adhesive 300 or another filler (e.g., insulating tape, caulk, sealant, foam) between the composite sidewall 160 and the composite floor 140, such as when necessary to fill intentional or unintentional spaces between the components.

The connection 600 illustratively includes an exterior connector 610 positioned outside of the cargo body 130 and an interior connector 620 positioned inside of the cargo body 130. The illustrative exterior connector 610 is a corner bracket that is generally L-shaped in cross-section, having a vertical portion 612 and a horizontal portion 614. The illustrative interior connector 620 is also a corner bracket that is generally L-shaped in cross-section, having a vertical portion 622 and a horizontal portion 624. Both the exterior connector 610 and the interior connector 620 may be elongate structures that extend horizontally along the length of vehicle 100. However, as discussed in Section 4 above, the exterior connector 610 and the interior connector 620 may vary in size and shape. For example, rather than being L-shaped as shown in FIG. 6, the exterior connector 610 may be flat.

To assemble the connection 600, the exterior connector 610 may first be adhesively bonded to the composite floor 140. Specifically, portion 612 of the exterior connector 610 may be adhesively bonded to the composite floor 140 using adhesive 300. Portion 614 of the exterior connector 610 may wrap beneath the composite floor 140 with or without the need for additional adhesive. Next, the composite sidewall 160 may be lowered onto the outer edge 144 of the composite floor 140 and adhesively bonded to portion 612 of the exterior connector 610 using adhesive 300. It is also within the scope of the present disclosure to adhesively bond the lower end 162 of the composite sidewall 160 directly to the outer edge 144 of the composite floor 140. Finally, the interior connector 620 may be adhesively bonded to the composite sidewall 160 and the composite floor 140. Specifically, portion 622 of the interior connector 620 may be adhesively bonded to the composite sidewall 160 using adhesive 300, and portion 624 of the interior connector 620 may be adhesively bonded to the composite floor 140 using adhesive 300.

According to an exemplary embodiment of the present disclosure, the outer edge 144 of the composite floor 140 includes an outer recess 145 that is sized and shaped to receive portion 624 of the interior connector 620. When assembled, the composite floor 140 and the interior connector 620 may cooperate to define a flush surface 630 for cargo.

7. Connection Between Composite Sidewalls and Composite Roof

Figure 7:
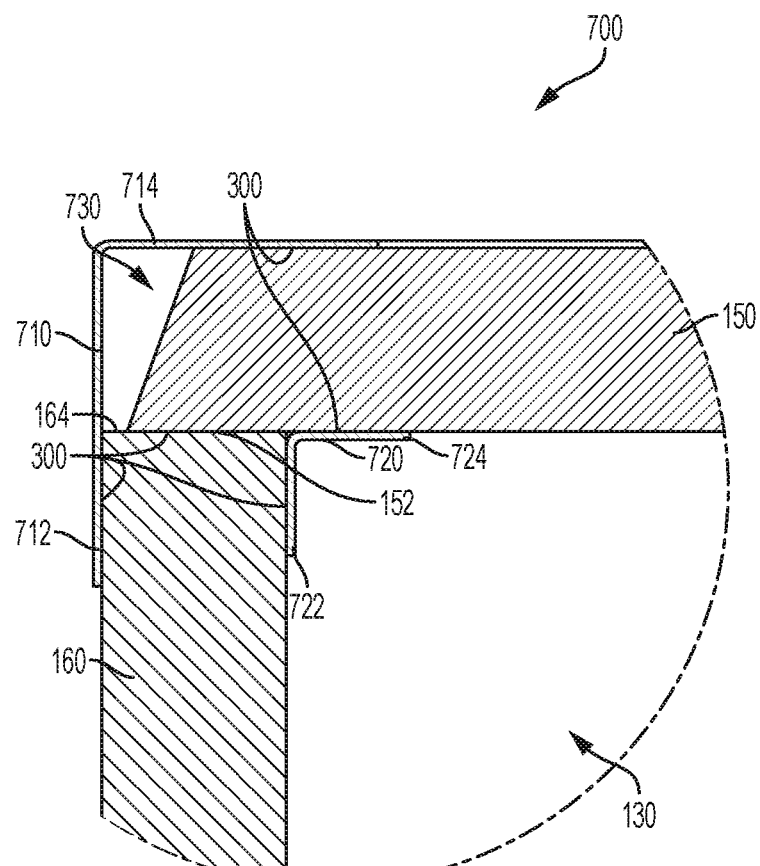
FIG. 7 is an assembled cross-sectional view of a connection between the sidewall and the roof.

Referring next to FIG. 7, a connection 700 is shown between the composite sidewall 160 and the composite roof 150. The outer edge 152 of the composite roof 150 may rest directly on the upper end 164 of the composite sidewall 160 to form a direct connection 700. It is also within the scope of the present disclosure to apply adhesive 300 or another filler between the composite sidewall 160 and the composite roof 150, such as when necessary to fill intentional or unintentional spaces between the components.

The connection 700 illustratively includes an exterior connector 710 positioned outside of the cargo body 130 and an interior connector 720 positioned inside of the cargo body 130. The illustrative exterior connector 710 is a corner bracket that is generally L-shaped in cross-section, having a vertical portion 712 and a horizontal portion 714. The illustrative interior connector 720 is also a corner bracket that is generally L-shaped in cross-section, having a vertical portion 722 and a horizontal portion 724. Both the exterior connector 710 and the interior connector 720 may be elongate structures that extend horizontally along the length of vehicle 100. However, as discussed in Section 4 above, the exterior connector 710 and the interior connector 720 may vary in size and shape. For example, rather than being L-shaped as shown in FIG. 7, the exterior connector 710 may be flat.

To assemble the connection 700, the composite roof 150 may first be lowered onto the upper end 164 of the composite sidewall 160. It is within the scope of the present disclosure to adhesively bond the composite roof 150 directly to the composite sidewall 160 using adhesive 300. Next, the exterior connector 710 may be adhesively bonded to the composite sidewall 160 and the composite roof 150. Specifically, portion 712 of the exterior connector 710 may be adhesively bonded to the composite sidewall 160 using adhesive 300, and portion 714 of the exterior connector 710 may be adhesively bonded to the composite roof 150 using adhesive 300. Finally, the interior connector 720 may be adhesively bonded to the composite sidewall 160 and the composite roof 150. Specifically, portion 722 of the interior connector 720 may be adhesively bonded to the composite sidewall 160 using adhesive 300, and portion 724 of the interior connector 720 may be adhesively bonded to the composite roof 150 using adhesive 300.

According to an exemplary embodiment of the present disclosure, connection 700 includes a conduit 730 to accommodate electrical wiring, air lines, or other equipment. In the illustrated embodiment of FIG. 7, the outer edge 152 of the composite roof 150 is shortened and spaced apart from the exterior connector 710 to define conduit 730 therebetween. Also, the outer edge 152 of the composite roof 150 is chamfered in FIG. 7, which may reduce interference between the composite roof 150 and the exterior connector 710. The size, shape, and location of conduit 730 may vary.

8. Connection Between Composite Nose and Composite Floor

Figure 8:
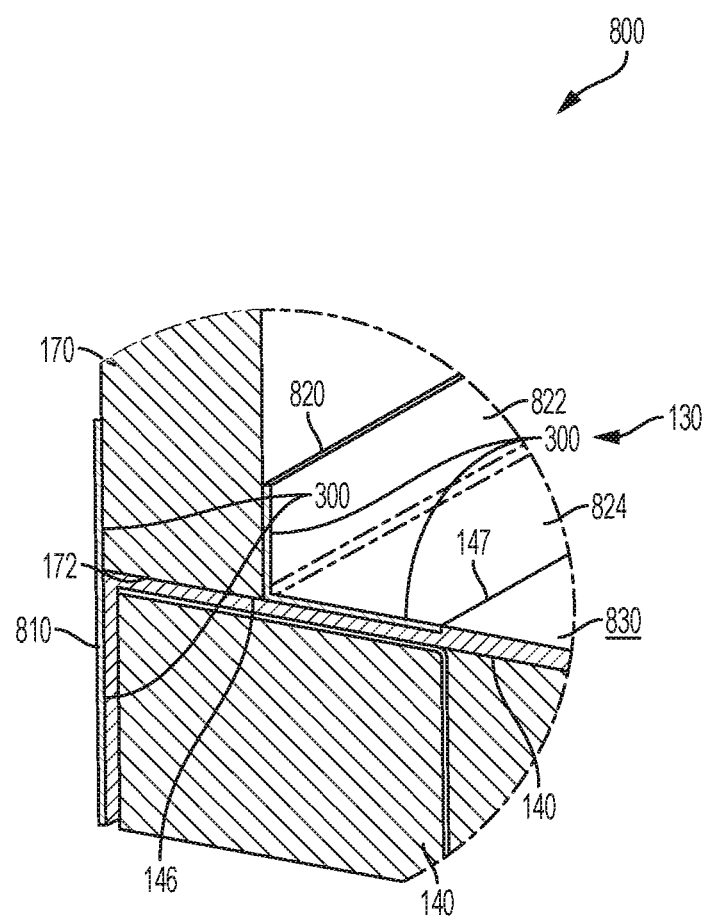
FIG. 8 is an assembled cross-sectional view of a connection between the nose and the floor.

Referring next to FIG. 8, a connection 800 is shown between the composite front wall or nose 170 and the composite floor 140. The lower end 172 of the composite nose 170 may rest directly atop the front edge 146 of the composite floor 140 to form a direct connection 800. It is also within the scope of the present disclosure to apply adhesive 300 or another filler between the composite nose 170 and the composite floor 140, such as when necessary to fill intentional or unintentional spaces between the components.

The connection 800 illustratively includes an exterior connector 810 positioned outside of the cargo body 130 and an interior connector 820 positioned inside of the cargo body 130. The illustrative exterior connector 810 is a flat plate. The illustrative interior connector 820 is a corner bracket that is generally L-shaped in cross-section, having a vertical portion 822 and a horizontal portion 824. Both the exterior connector 810 and the interior connector 820 may be elongate structures that extend horizontally along the width of vehicle 100. However, as discussed in Section 4 above, the exterior connector 810 and the interior connector 820 may vary in size and shape. For example, rather than being flat as shown in FIG. 8, the exterior connector 810 may be L-shaped.

To assemble the connection 800, the exterior connector 810 may first be adhesively bonded to the composite floor 140 using adhesive 300. Next, the composite nose 170 may be lowered onto the front edge 146 of the composite floor 140 and adhesively bonded to the exterior connector 810 using adhesive 300. It is also within the scope of the present disclosure to adhesively bond the lower end 172 of the composite nose 170 directly to the front edge 146 of the composite floor 140. Finally, the interior connector 820 may be adhesively bonded to the composite nose 170 and the composite floor 140. Specifically, portion 822 of the interior connector 820 may be adhesively bonded to the composite nose 170 using adhesive 300, and portion 824 of the interior connector 820 may be adhesively bonded to the composite floor 140 using adhesive 300.

According to an exemplary embodiment of the present disclosure, the front edge 146 of the composite floor 140 includes a front recess 147 that is sized and shaped to receive portion 824 of the interior connector 820. When assembled, the composite floor 140 and the interior connector 820 may cooperate to define a flush surface 830 for cargo.

9. Connection Between Composite Nose and Composite Roof

Figure 9:
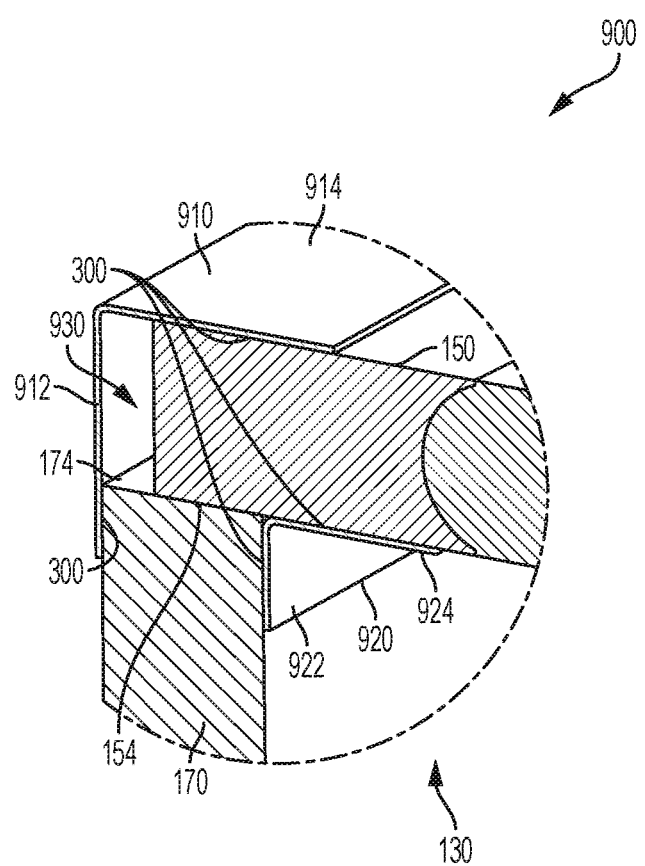
FIG. 9 is an assembled cross-sectional view of a connection between the nose and the roof.

Referring next to FIG. 9, a connection 900 is shown between the composite nose 170 and the composite roof 150. The upper end 174 of the composite nose 170 may rest directly beneath the front edge 154 of the composite roof 150 to form a direct connection 900. It is also within the scope of the present disclosure to apply adhesive 300 or another filler between the composite nose 170 and the composite roof 150, such as when necessary to fill intentional or unintentional spaces between the components.

The connection 900 illustratively includes an exterior connector 910 positioned outside of the cargo body 130 and an interior connector 920 positioned inside of the cargo body 130. The illustrative exterior connector 910 is a corner bracket that is generally L-shaped in cross-section, having a vertical portion 912 and a horizontal portion 914. The illustrative interior connector 920 is also a corner bracket that is generally L-shaped in cross-section, having a vertical portion 922 and a horizontal portion 924. Both the exterior connector 910 and the interior connector 920 may be elongate structures that extend horizontally along the width of vehicle 100. However, as discussed in Section 4 above, the exterior connector 910 and the interior connector 920 may vary in size and shape. For example, rather than being L-shaped as shown in FIG. 9, the exterior connector 910 may be flat.

To assemble the connection 900, the composite roof 150 may first be lowered onto the upper end 174 of the composite nose 170. It is within the scope of the present disclosure to adhesively bond the composite roof 150 directly to the composite nose 170 using adhesive 300. Next, the exterior connector 910 may be adhesively bonded to the composite nose 170 and the composite roof 150. Specifically, portion 912 of the exterior connector 910 may be adhesively bonded to the composite nose 170 using adhesive 300, and portion 914 of the exterior connector 910 may be adhesively bonded to the composite roof 150 using adhesive 300. In this position, the exterior connector 910 may protect the upper front end 102 of the cargo body 130 from overhead objects, such as trees or garage doors, for example. Finally, the interior connector 920 may be adhesively bonded to the composite nose 170 and the composite roof 150. Specifically, portion 922 of the interior connector 920 may be adhesively bonded to the composite nose 170 using adhesive 300, and portion 924 of the interior connector 920 may be adhesively bonded to the composite roof 150 using adhesive 300.

According to an exemplary embodiment of the present disclosure, connection 900 includes a conduit 930 to accommodate electrical wiring, air lines, or other equipment. In the illustrated embodiment of FIG. 9, the front edge 154 of the composite roof 150 is shortened and spaced apart from the exterior connector 910 to define conduit 930 therebetween. The size, shape, and location of conduit 930 may vary. In certain embodiments, the conduit 930 that runs above the nose 170 may communicate with the conduits 730 that run above the side walls 160 (FIG. 7).

10. Connection Between Composite Nose and Composite Sidewalls

Figure 10:
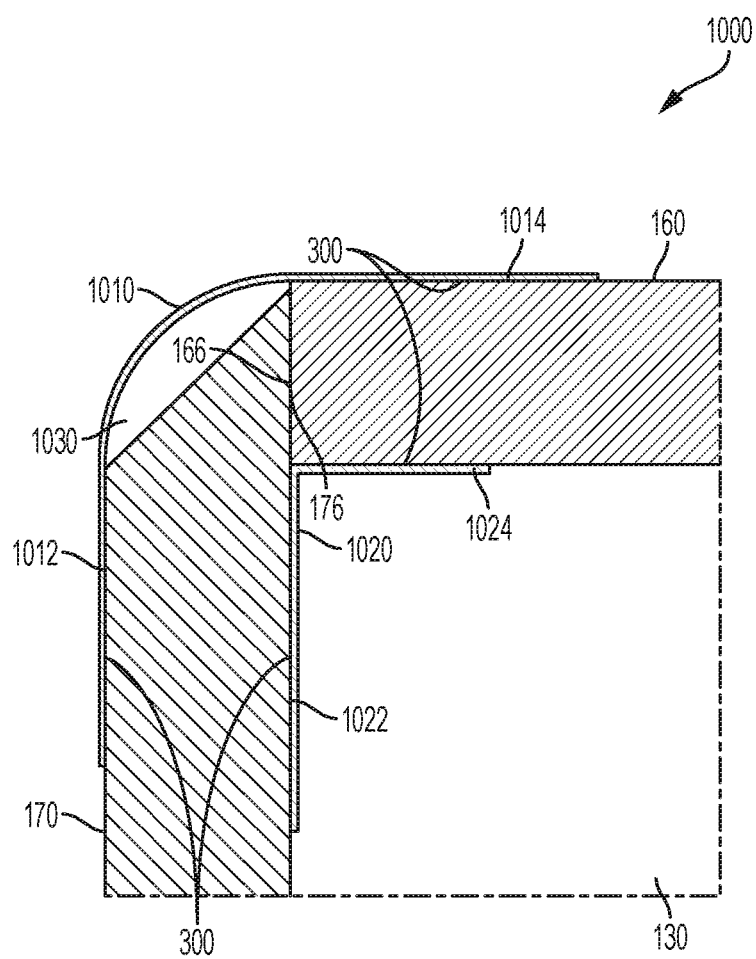
FIG. 10 is an assembled cross-sectional view of a connection between the nose and the sidewall.

Referring next to FIG. 10, a connection 1000 is shown between the composite nose 170 and the composite sidewall 160. The outer edge 176 of the nose 170 may rest directly against the front end 166 of the composite sidewall 160 to form a direct connection 1000. It is also within the scope of the present disclosure to apply adhesive 300 or another filler between the composite nose 170 and the composite sidewall 160, such as when necessary to fill intentional or unintentional spaces between the components.

The connection 1000 illustratively includes an exterior connector 1010 positioned outside of the cargo body 130 and an interior connector 1020 positioned inside of the cargo body 130. The illustrative exterior connector 1010 is a curved corner bracket that is generally a rounded L-shape in cross-section, having a front portion 1012 and a side portion 1014. The illustrative interior connector 1020 is a corner bracket that is generally L-shaped in cross-section, having a front portion 1022 and a side portion 1024. Both the exterior connector 1010 and the interior connector 1020 may be elongate structures that extend vertically along the height of vehicle 100. However, as discussed in Section 4 above, the exterior connector 1010 and the interior connector 1020 may vary in size and shape. For example, rather than being a rounded L-shape as shown in FIG. 10, the exterior connector 1010 may be L-shaped or flat.

To assemble the connection 1000, the outer edge 176 of the nose 170 may first be positioned against the front end 166 of the composite sidewall 160. It is within the scope of the present disclosure to adhesively bond the composite nose 170 directly to the composite sidewall 160. Next, the exterior connector 1010 may be adhesively bonded to the composite nose 170 and the composite sidewall 160. Specifically, portion 1012 of the exterior connector 1010 may be adhesively bonded to the composite nose 170 using adhesive 300, and portion 1014 of the exterior connector 1010 may be adhesively bonded to the composite sidewall 160 using adhesive 300. Finally, the interior connector 1020 may be adhesively bonded to the composite nose 160 and the composite sidewall 170. Specifically, portion 1022 of the interior connector 1020 may be adhesively bonded to the composite nose 160 using adhesive 300, and portion 1024 of the interior connector 1020 may be adhesively bonded to the composite sidewall 160 using adhesive 300.

According to an exemplary embodiment of the present disclosure, connection 1000 includes a conduit 1030 to accommodate electrical wiring, air lines, or other equipment. In the illustrated embodiment of FIG. 10, the outer edge 176 of the nose 170 is shortened and spaced apart from the exterior connector 1010 to define conduit 1030 therebetween. Also, the outer edge 176 of the nose 170 is chamfered in FIG. 10, which may reduce interference between the nose 170 and the exterior connector 1010. The size, shape, and location of conduit 1030 may vary. In certain embodiments, the conduit 1030 that runs alongside the nose 170 may communicate with the conduit 930 that runs above the nose 170 (FIG. 9) and the conduits 730 that run above the side walls 160 (FIG. 7).

11. Connection Between Composite Roof and Metallic Rear Frame

Figure 11:
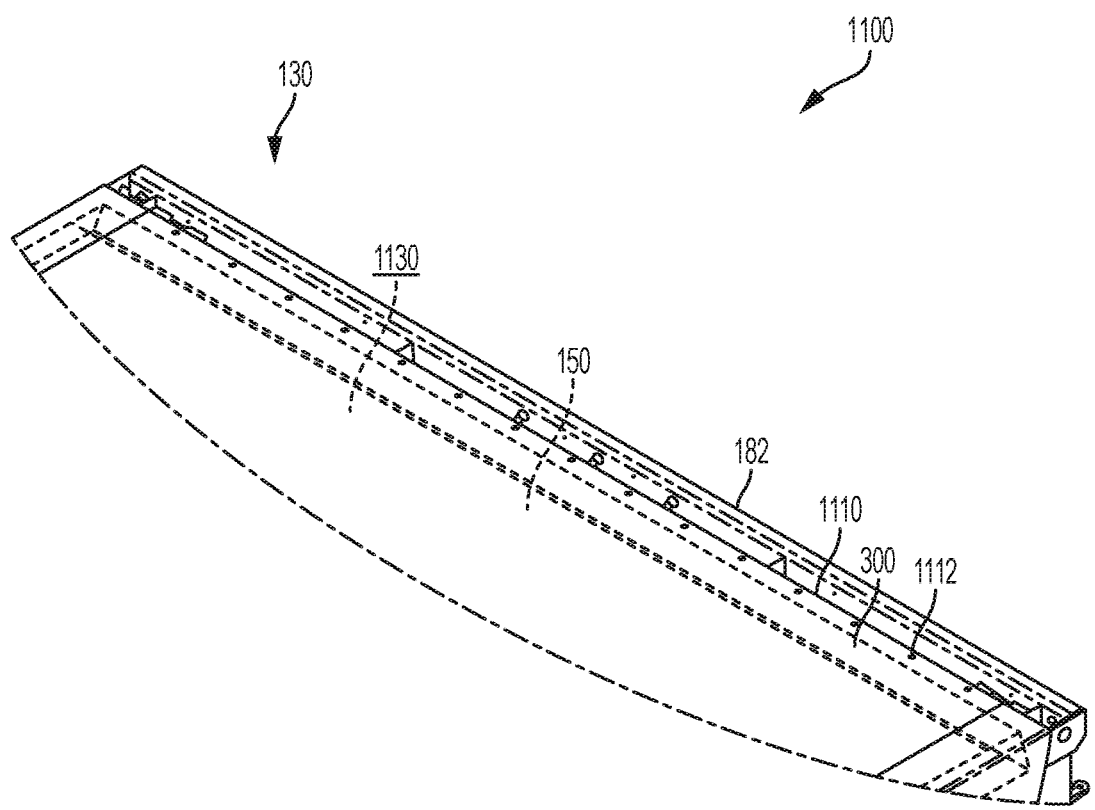
FIG. 11 is an assembled perspective view of a connection between the roof and the rear frame.
Figure 12:
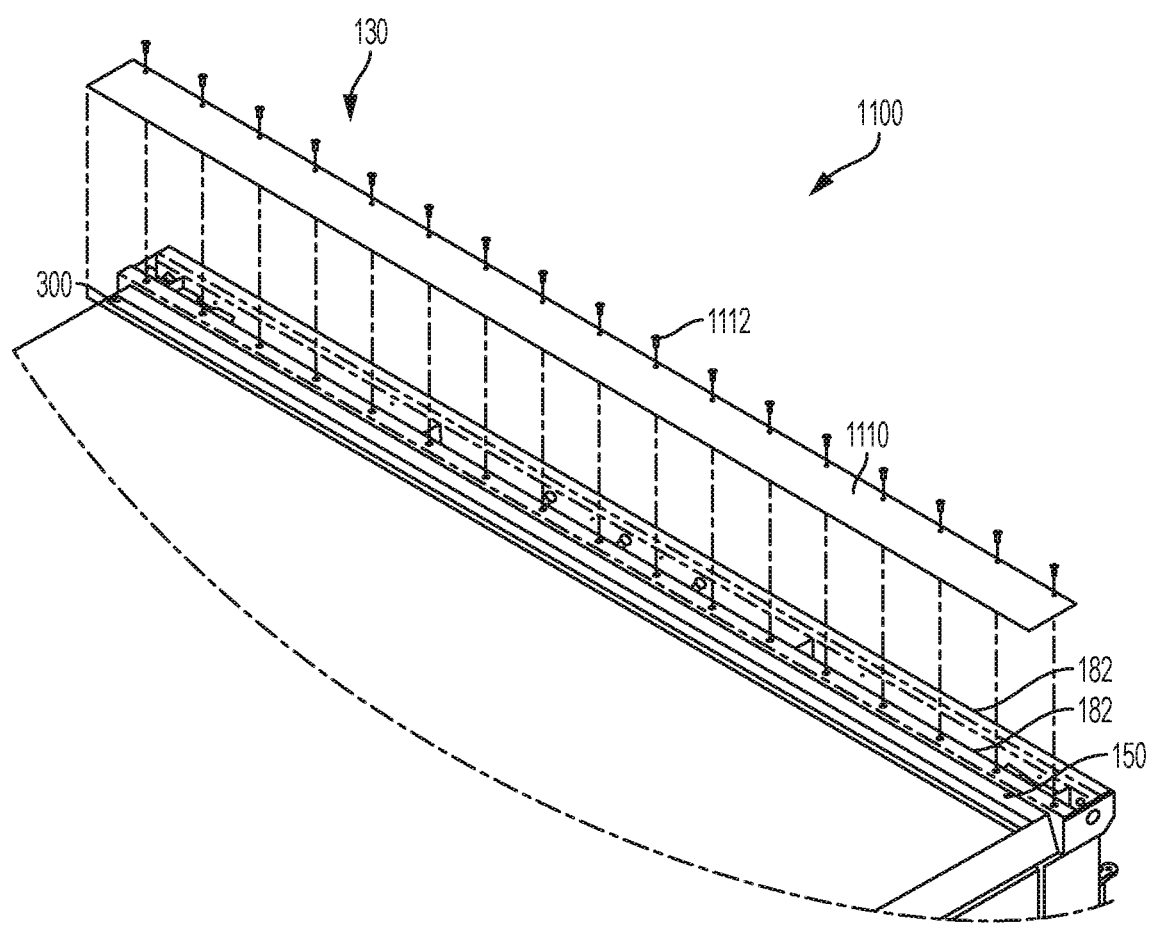
FIG. 12 is an exploded perspective view of the connection of FIG. 11.
Figure 13:
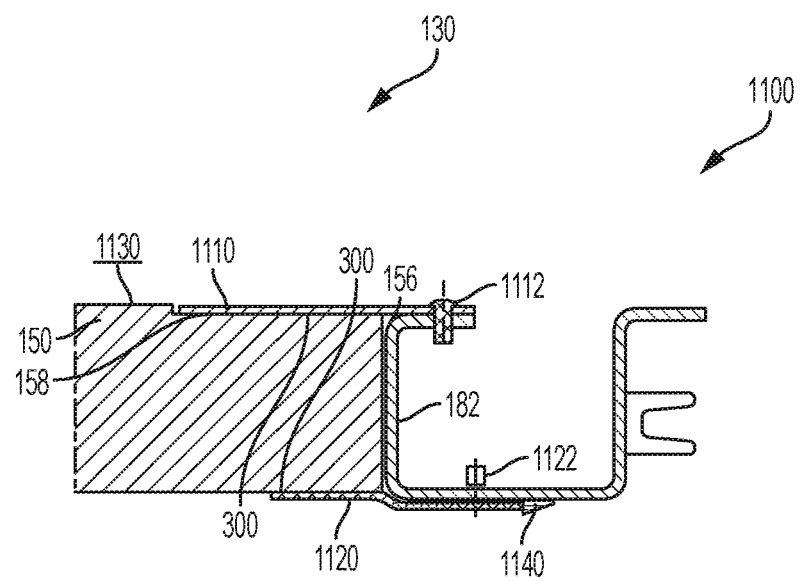
FIG. 13 is an assembled cross-sectional view of the connection of FIG. 11.

Referring next to FIGS. 11-13, a connection 1100 is shown between the composite roof 150 and the metallic rear frame 182. The rear end 156 of the composite roof 150 may rest in front of the metallic rear frame 182. It is also within the scope of the present disclosure to apply adhesive 300 or another filler between the composite roof 150 and the metallic rear frame 182, such as when necessary to fill intentional or unintentional spaces between the components.

The connection 1100 illustratively includes an exterior connector 1110 positioned outside of the cargo body 130 and an interior connector 1120 (FIG. 13) positioned inside of the cargo body 130. The illustrative exterior connector 1110 is a flat plate. The illustrative interior connector 1120 is a bent plate. Both the exterior connector 1110 and interior connector 1120 are elongate structures that extend horizontally along the width of vehicle 100. However, as discussed in Section 4 above, the exterior connector 1110 and the interior connector 1120 may vary in size and shape. For example, rather than being flat as shown in FIG. 13, the exterior connector 1110 may be bent or L-shaped.

To assemble the connection 1100, the exterior connector 1110 may be adhesively bonded to the composite roof 150 using adhesive 300 and simultaneously mechanically fastened to the metallic rear frame 182 using an initial set of fasteners 1112. After the adhesive 300 solidifies, the remaining fasteners 1112 may be inserted to fully secure the exterior connector 1110 to the rear frame 182. This process may be repeated for the interior connector 1120 by adhesively bonding the interior connector 1120 to the composite roof 150 using adhesive 300 and mechanically fastening the interior connector 1120 to the metallic rear frame 182 using fasteners 1122. It is also within the scope of the present disclosure that the exterior connector 1110 and/or the interior connector 1120 may be adhesively bonded to the metallic rear frame 182 rather than being mechanically fastened to the metallic rear frame 182. It is further within the scope of the present disclosure to adhesively bond the composite roof 150 directly to the metallic rear frame 182, with or without using the exterior connector 1110 and/or the interior connector 1120.

According to an exemplary embodiment of the present disclosure, the composite roof 150 includes a rear recess 158 that is sized and shaped to receive the exterior connector 1110. When assembled, the composite roof 150 and the exterior connector 1110 may cooperate to define a flush upper surface 1130 that promotes water run-off from vehicle 100.

According to another exemplary embodiment of the present disclosure, the connection 1100 further includes a thermal break plate 1140 positioned between the metallic interior connector 1120 and the metallic rear frame 182. The thermal break plate 1140 may be constructed of an insulating material to reduce or prevent heat transfer between the interior connector 1120 and the rear frame 182.

Figure 14:
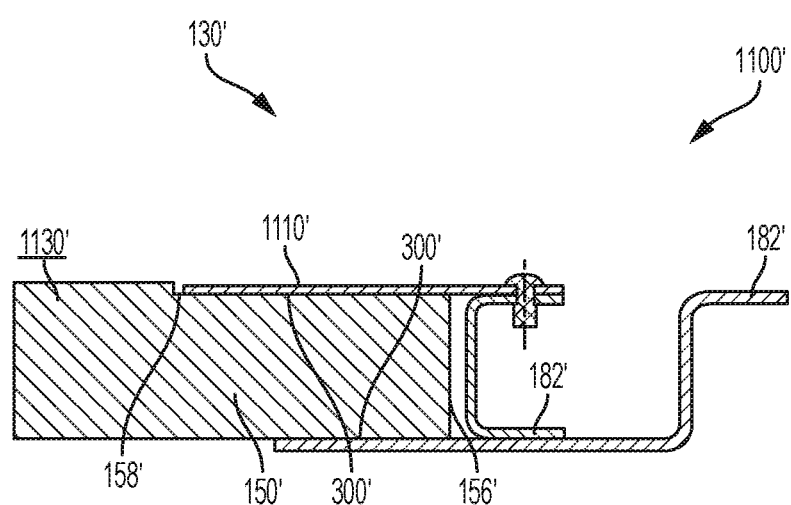
FIG. 14 is an assembled cross-sectional view of an alternative connection to FIG. 13.

An alternative connection 1100' is shown in FIG. 14. The connection 1100' illustratively includes an exterior connector 1110' like exterior connector 1110 (FIG. 13). However, the rear frame 182' extends directly beneath the composite roof 150' to take the place of an interior connector. The rear frame 182' may be adhesively bonded directly to the composite roof 150' in this embodiment.

12. Connection Between Composite Sidewalls and Metallic Rear Frame

Figure 15:
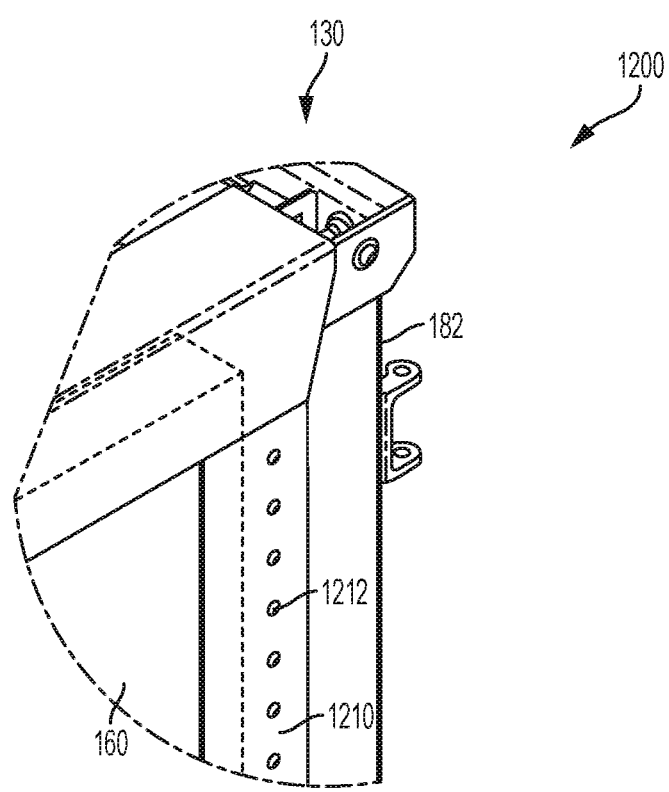
FIG. 15 is an assembled perspective view of a connection between and the rear frame.
Figure 16:
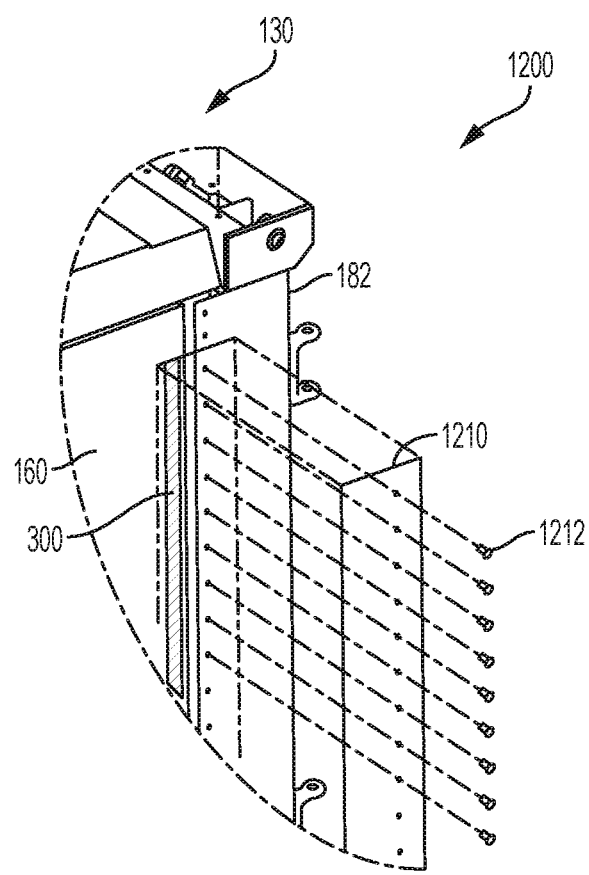
FIG. 16 is an exploded perspective view of the connection of FIG. 15.
Figure 17:
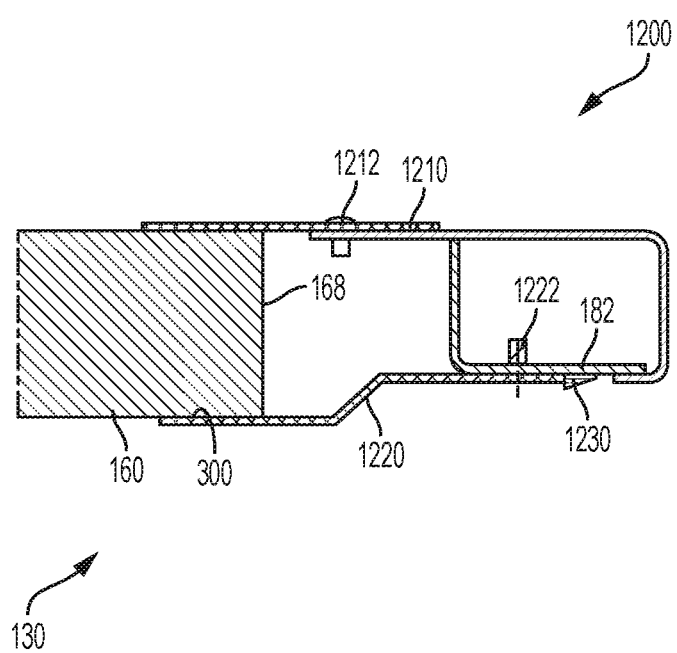
FIG. 17 is an assembled cross-sectional view of the connection of FIG. 15.

Referring next to FIGS. 15-17, a connection 1200 is shown between the composite sidewall 160 and the metallic rear frame 182. The rear end 168 of the composite sidewall 160 may rest in front of the metallic rear frame 182. It is also within the scope of the present disclosure to apply adhesive 300 or another filler between the composite sidewall 160 and the metallic rear frame 182, such as when necessary to fill intentional or unintentional spaces between the components.

The connection 1200 illustratively includes an exterior connector 1210 positioned outside of the cargo body 130 and an interior connector 1220 (FIG. 17) positioned inside of the cargo body 130. The illustrative exterior connector 1210 is a flat plate. The illustrative interior connector 1220 is a bent plate. Both the exterior connector 1210 and interior connector 1220 are elongate structures that extend vertically along the height of vehicle 100. However, as discussed in Section 4 above, the exterior connector 1210 and the interior connector 1220 may vary in size and shape. For example, rather than being flat as shown in FIG. 17, the exterior connector 1210 may be bent or L-shaped.

To assemble the connection 1200, the exterior connector 1210 may be adhesively bonded to the composite sidewall 160 using adhesive 300 and simultaneously mechanically fastened to the metallic rear frame 182 using an initial set of fasteners 1212. After the adhesive 300 solidifies, the remaining fasteners 1212 may be inserted to fully secure the exterior connector 1210 to the rear frame 182. This process may be repeated for the interior connector 1220 by adhesively bonding the interior connector 1220 to the composite sidewall 160 using adhesive 300 and mechanically fastening the interior connector 1220 to the metallic rear frame 182 using fasteners 1222. It is also within the scope of the present disclosure that the exterior connector 1210 and/or the interior connector 1220 may be adhesively bonded to the metallic rear frame 182 rather than being mechanically fastened to the metallic rear frame 182. It is further within the scope of the present disclosure to adhesively bond the composite sidewall 160 directly to the metallic rear frame 182, with or without using the exterior connector 1210 and/or the interior connector 1220.

According to another exemplary embodiment of the present disclosure, the connection 1200 includes a thermal break plate 1230 positioned between the metallic interior connector 1220 and the metallic rear frame 182. The thermal break plate 1230 may be constructed of an insulating material to reduce or prevent heat transfer between the interior connector 1220 and the rear frame 182.

13. Connection Between Composite Floor and Metallic Rear Frame

Figure 18:
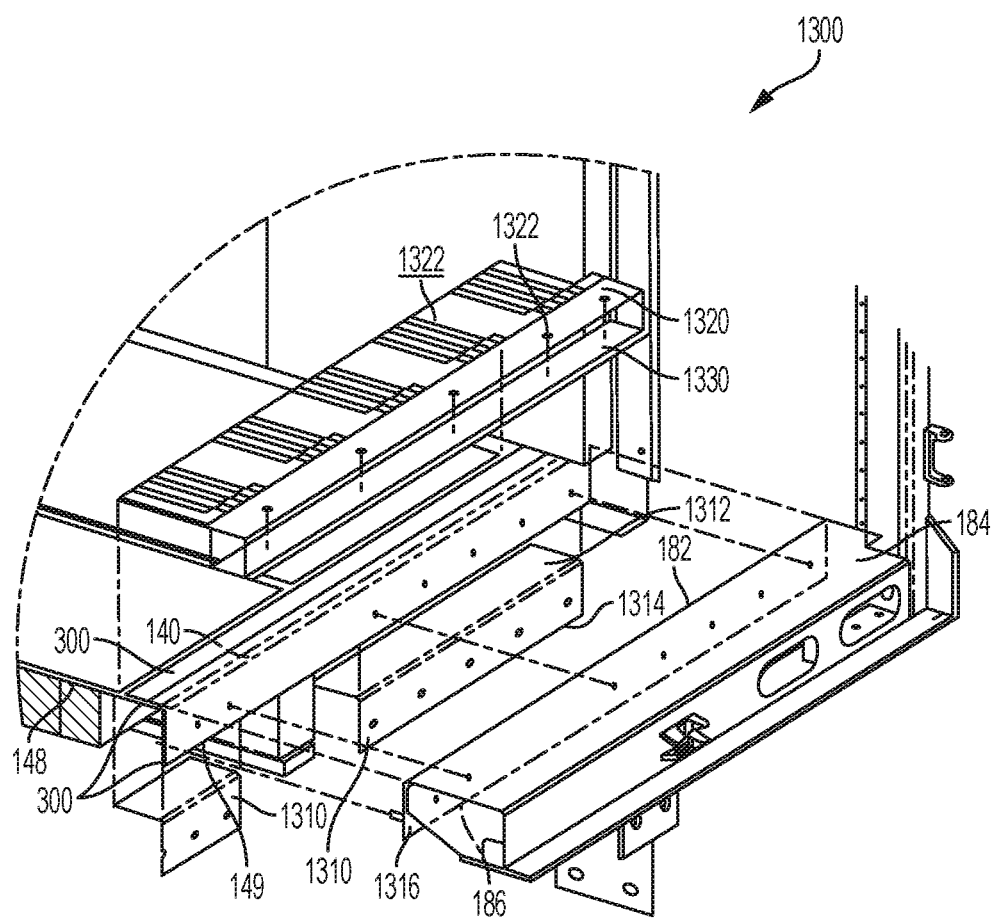
FIG. 18 is an exploded perspective view of a connection between the floor and the rear frame.
Figure 19:
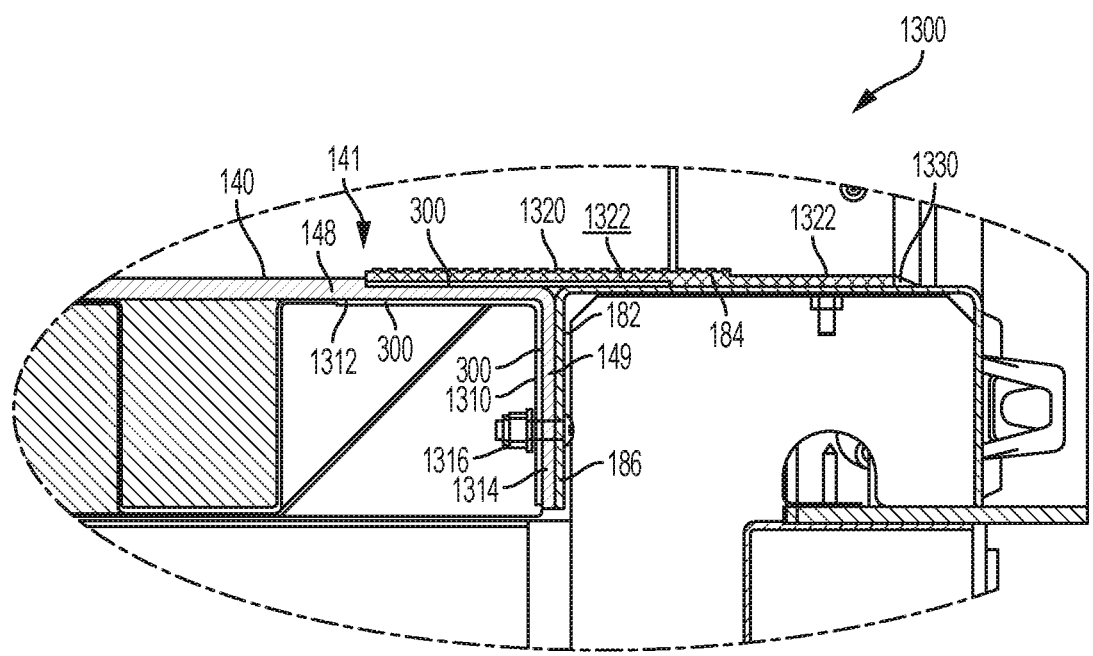
FIG. 19 is an assembled cross-sectional view of the connection of FIG. 18.

Referring next to FIGS. 18 and 19, a connection 1300 is shown between the composite floor 140 and the metallic rear frame 182. The composite floor 140 includes a rear horizontal portion 148 and a downwardly-extending rear vertical portion 149. Similarly, the metallic rear frame 182 includes a horizontal portion 184 and a downwardly-extending vertical portion 186 (i.e., fantail). It is also within the scope of the present disclosure to apply adhesive 300 or another filler between the composite floor 140 and the metallic rear frame 182, such as when necessary to fill intentional or unintentional spaces between the components.

The connection 1300 illustratively includes a lower connector 1310 and an upper connector 1320. The illustrative lower connector 1310 is a corner bracket that is generally L-shaped in cross-section, having a horizontal portion 1312 and a vertical portion 1314. The illustrative upper connector 1320 is a flat plate with a textured, slip-resistant surface 1322. Both the lower connector 1310 and the upper connector 1320 may be elongate structures that extend horizontally along the width of vehicle 100. However, as discussed in Section 4 above, the lower connector 1310 and the upper connector 1320 may vary in size and shape.

To assemble the connection 1300, the lower connector 1310 may first be adhesively bonded to the composite floor 140. Specifically, the horizontal portion 1312 of the lower connector 1310 may be adhesively bonded to the horizontal portion 148 of the composite floor 140 using adhesive 300, and the vertical portion 1314 of the lower connector 1310 may be adhesively bonded to the vertical portion 149 of the composite floor 140 using adhesive 300. Next, the metallic rear frame 182 may be mechanically fastened to the composite floor 140 by inserting fasteners 1316 horizontally through aligned holes in the vertical portion 186 of the metallic rear frame 182, the vertical portion 149 of the composite floor 140, and the vertical portion 1314 of the lower connector 1310. In this arrangement, the lower connector 1310 may serve as a backing plate that supports the composite floor 140 for receipt of the fasteners 1316 by reducing potential stress concentrations around the fasteners 1316 and their corresponding holes. Next, the upper connector 1320 may be adhesively bonded to the horizontal portion 148 of the composite floor 140 using adhesive 300 and simultaneously mechanically fastened to the horizontal portion 184 of the metallic rear frame 182 using an initial set of fasteners 1322. After the adhesive 300 solidifies, the remaining fasteners 1322 may be inserted to fully secure the upper connector 1320 to the rear frame 182. It is also within the scope of the present disclosure that the lower connector 1310 and/or the upper connector 1320 may be adhesively bonded to the metallic rear frame 182 rather than being mechanically fastened to the metallic rear frame 182. It is further within the scope of the present disclosure to adhesively bond the composite floor 140 directly to the metallic rear frame 182, with or without using the lower connector 1310 and/or the upper connector 1320.

According to an exemplary embodiment of the present disclosure, the composite floor 140 includes a rear recess 141 that is sized and shaped to receive the upper connector 1320. When assembled, the upper connector 1320 may serve as a step or threshold between the composite floor 140 and the metallic rear frame 182.

According to another exemplary embodiment of the present disclosure, the connection 1300 further includes a thermal break plate 1330 positioned between the metallic upper connector 1320 and the metallic rear frame 182. Specifically, the thermal break plate 1330 may be positioned between metallic upper connector 1320 and the horizontal portion 184 of the metallic rear frame 182. The thermal break plate 1330 may be constructed of an insulating material to reduce or prevent heat transfer between the upper connector 1320 and the rear frame 182.

14. Connection Between Metallic Bumper Assembly and Metallic Chassis

Figure 20:
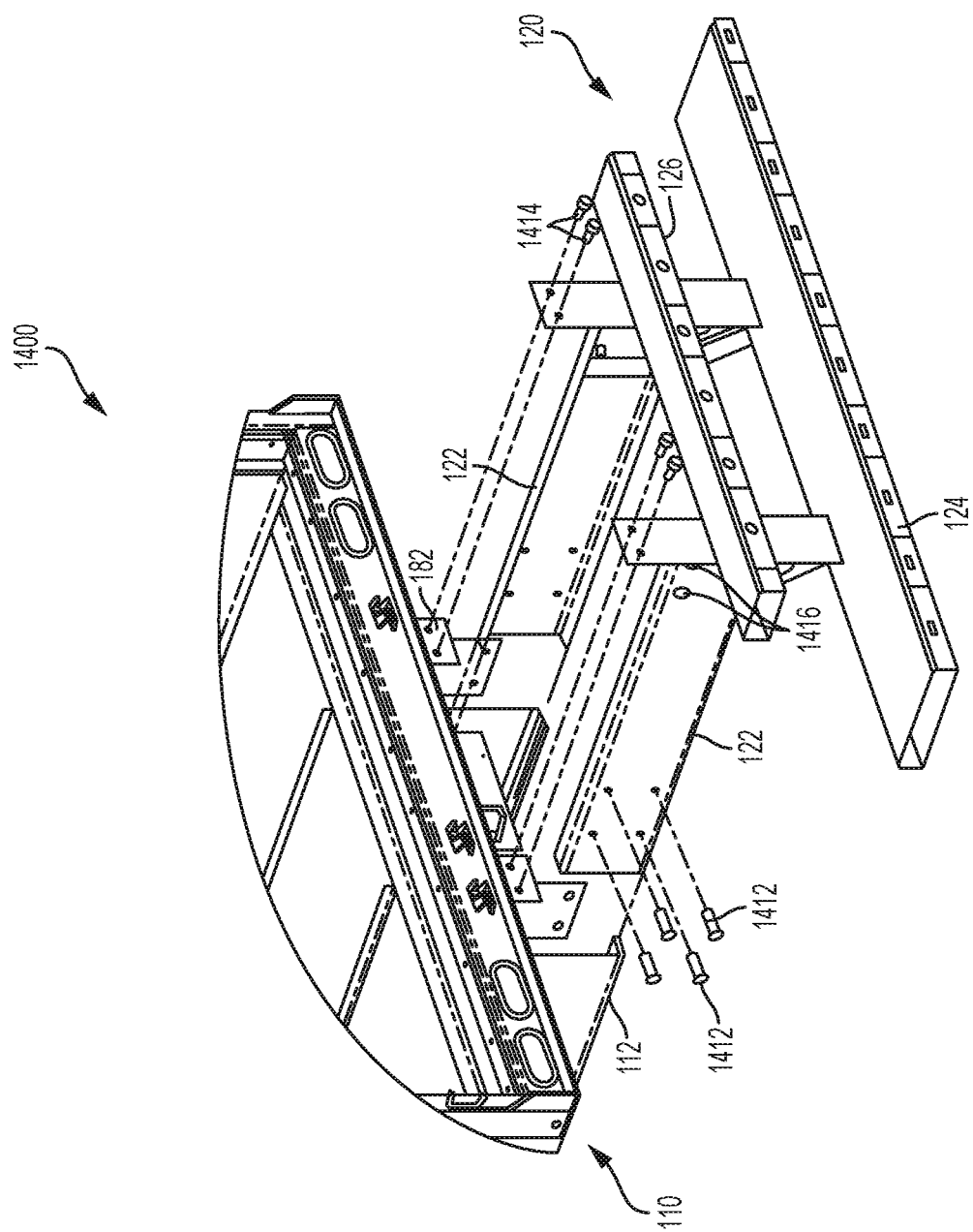
FIG. 20 is an exploded perspective view of a connection between the chassis and the bumper assembly.
Figure 21:
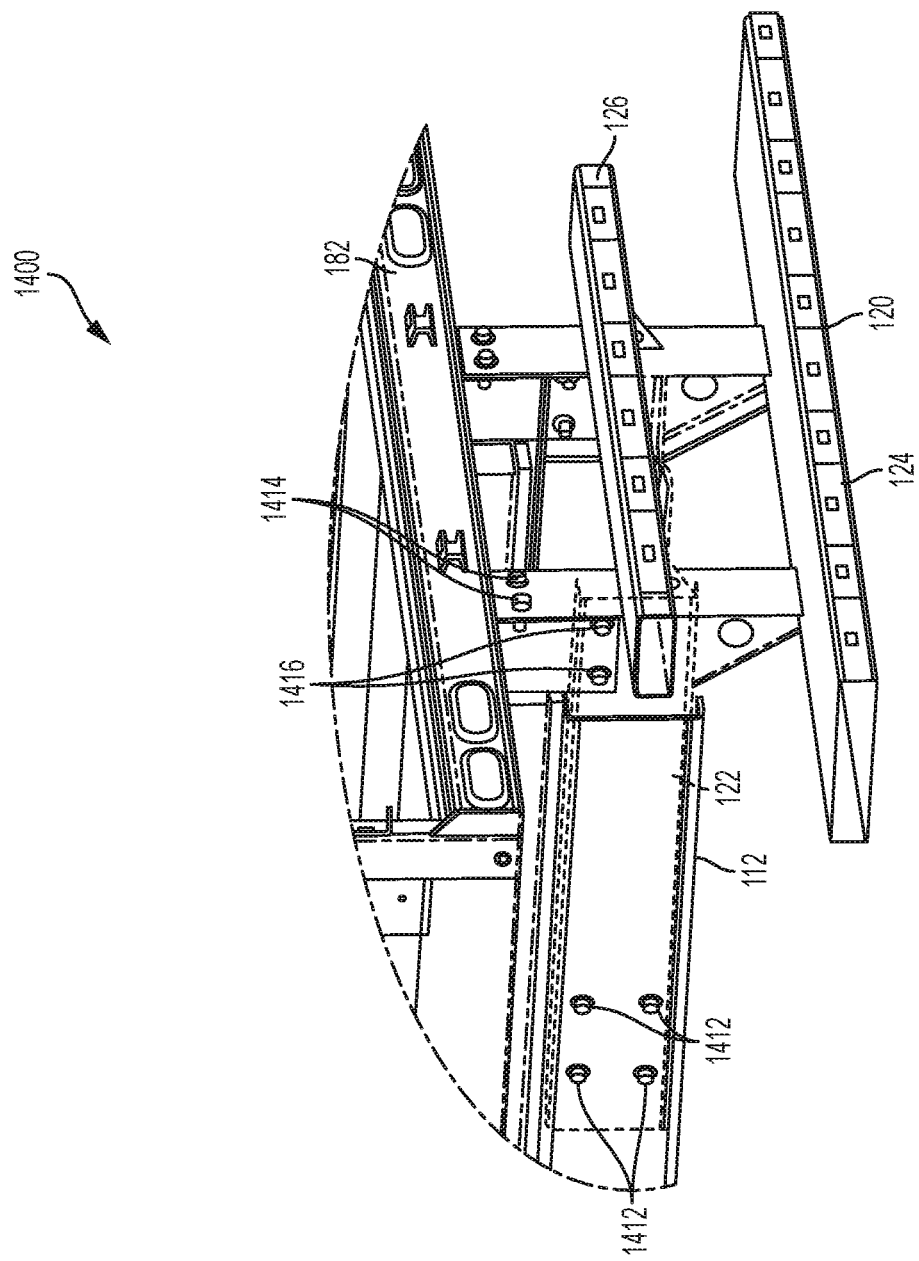
FIG. 21 is an assembled perspective view of the connection of FIG. 20.

Referring next to FIGS. 20 and 21, a connection 1400 is shown between the bumper assembly 120 and the chassis 110. The bumper assembly 120 includes right and left metallic bumper support rails 122, a first step 124, and a second step 126. As discussed above, the chassis 110 includes corresponding right and left metallic rails 112 that are generally C-shaped in cross-section.

To assemble the connection 1400, the metallic bumper support rails 122 of the bumper assembly 120 are received into corresponding metallic rails 112 of chassis 100. Then, to prevent the metallic bumper support rails 122 from sliding relative to the metallic rails 112, the metallic bumper support rails 122 and the metallic rails 112 are mechanically fastened together using laterally-extending fasteners 1412. Also, the metallic bumper support rails 122 are mechanically fastened to the rear frame 182 using longitudinally-extending fasteners 1414 and laterally-extending fasteners 1416.

15. Connection Between Composite Sidewall and Side Door

Figure 22:
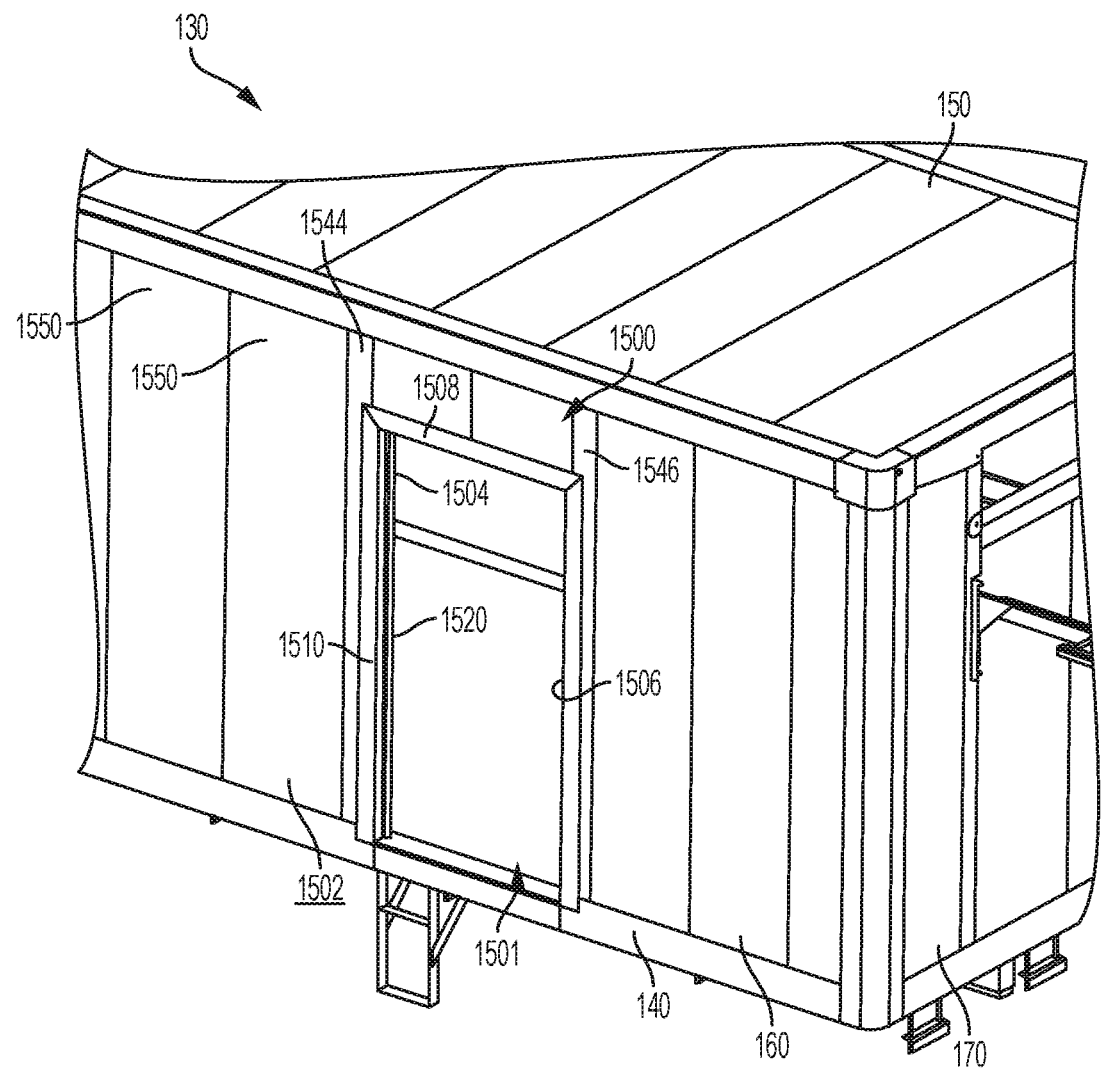
FIG. 22 is a perspective view of a connection between the right sidewall and a side door.
Figure 23:
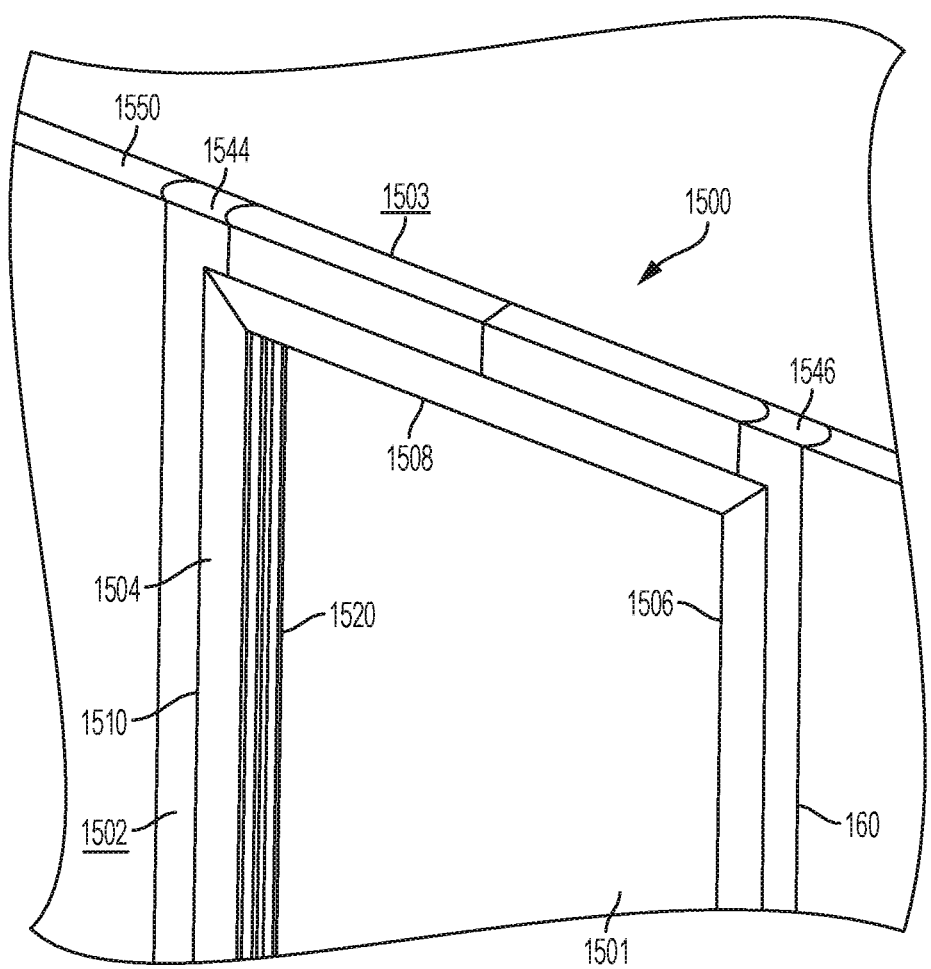
FIG. 23 is a horizontal cross-sectional view above the connection of FIG. 22.
Figure 24:
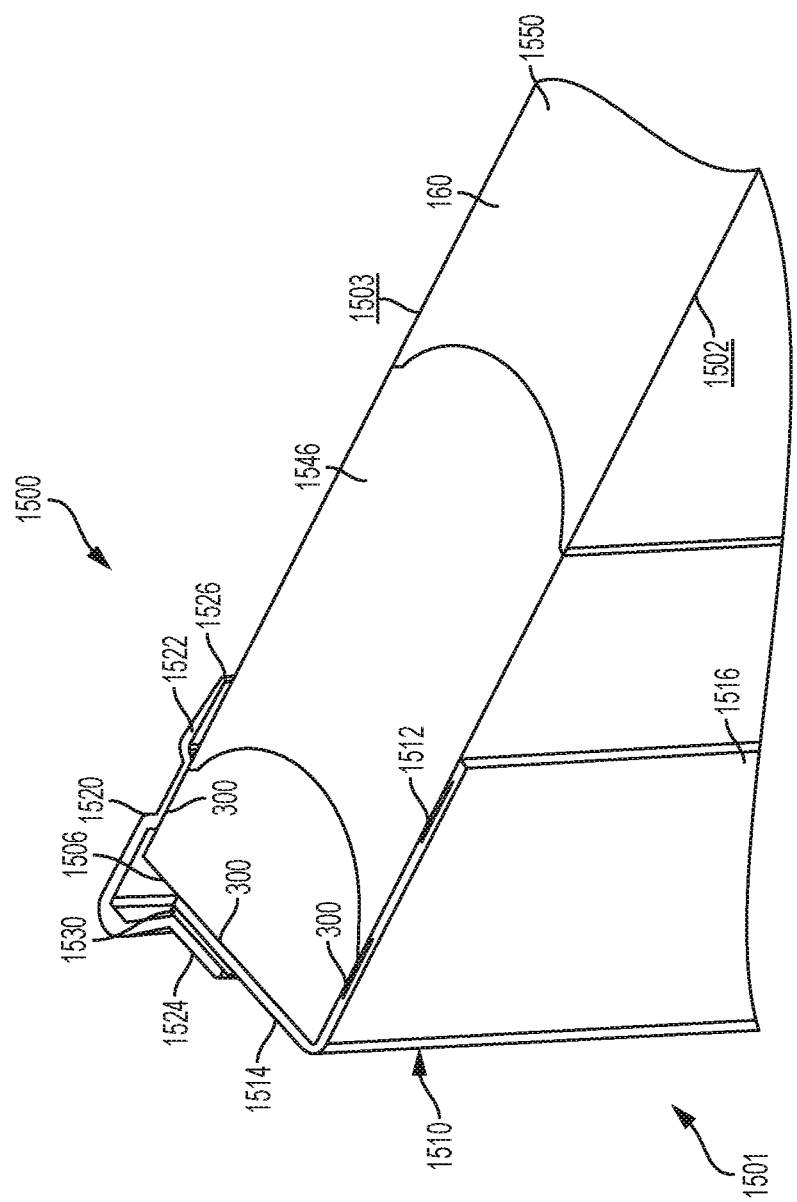
FIG. 24 is a horizontal cross-sectional view through the connection of FIG. 22.

Referring next to FIGS. 22-24, a connection 1500 is provided between the composite sidewall 160 and a side door (not shown). The composite sidewall 160 includes a rectangular opening 1501 that extends through the composite sidewall 160 from an exterior surface 1502 to an interior surface 1503 to receive the side door. Between the exterior surface 1502 and the interior surface 1503, the opening 1501 is defined by a rear vertical edge 1504, a front vertical edge 1506, and an overhead horizontal edge 1508 of the composite sidewall 160. The opening 1501 may be formed in the composite sidewall 160 during the process of molding the composite sidewall 160 or after the process of molding the composite sidewall 160, such as by cutting the opening 1501 into the composite sidewall 160. In the event that one or more of the edges 1504, 1506, 1508 is a raw foam rather than a fiberglass and/or polymer skin, the edges 1504, 1506, 1508 may be coated or treated to minimize water penetration and air leaks.

The connection 1500 illustratively includes an exterior connector 1510 positioned outside of the cargo body 130 and an interior connector 1520 positioned inside of the cargo body 130. The exterior connector 1510 and the interior connector 1520 cooperate to frame the opening 1501 in the composite sidewall 160 for receipt of the side door. For example, the exterior connector 1510 and the interior connector 1520 may span the edges 1504, 1506, 1508 of the composite sidewall 160 to frame the opening 1501 in the composite sidewall 160. Thus, the exterior connector 1510 and/or the interior connector 1520 may also be referred to herein as a door frame.

As shown in FIG. 24, the illustrative exterior connector 1510 is generally L-shaped in cross-section, having an exterior side portion 1512 and an inwardly-extending portion 1514. The illustrative interior connector 1520 is also generally L-shaped in cross-section, having an interior side portion 1522 and an outwardly-extending portion 1524. However, as discussed in Section 4 above, the exterior connector 1510 and the interior connector 1520 may vary in size and shape. For example, rather than being L-shaped as shown in FIG. 24, the exterior connector 1510 and/or the interior connector 1520 may be flat.

To assemble the connection 1500, the exterior connector 1510 may be adhesively bonded to the composite sidewall 160 using adhesive 300. Specifically, portion 1512 of the exterior connector 1510 may be adhesively bonded to the exterior surface 1502 of composite sidewall 160 using adhesive 300, and portion 1514 of the exterior connector 1510 may be adhesively bonded to edges 1504, 1506, 1508 of composite sidewall 160 using adhesive 300. Portion 1524 of the interior connector 1520 may be positioned to at least partially overlap portion 1514 of the exterior connector 1510, as shown in FIG. 24. The interior connector 1520 may be adhesively bonded to the composite sidewall 160 and the overlapped exterior connector 1510 using adhesive 300. Specifically, portion 1522 of the interior connector 1520 may be adhesively bonded to the interior surface 1503 of composite sidewall 160 using adhesive 300, and portion 1524 of the interior connector 1520 may be adhesively bonded to the overlapped portion 1514 of the exterior connector 1510 using adhesive 300. Rather than the interior connector 1520 overlapping the exterior connector 1510, it is also within the scope of the present disclosure for the exterior connector 1510 to overlap the interior connector 1520. It is also within the scope of the present disclosure for portion 1524 of the interior connector 1520 to be adhesively bonded directly to edges 1504, 1506, 1508 of composite sidewall 160 using adhesive 300. It is further within the scope of the present disclosure for the exterior connector 1510 and/or the interior connector 1520 to be mechanically fastened to the composite sidewall 160. With the exterior connector 1510 and the interior connector 1520 secured in place, the side door (not shown) may be attached (e.g., riveted) to the exterior connector 1510 and/or the interior connector 1520.

According to an exemplary embodiment of the present disclosure, the connection 1500 includes a thermal break plate 1530 positioned between the overlapping portion 1514, 1524 of the connectors 1510, 1520. The thermal break plate 1530 may be constructed of an insulating material to reduce or prevent heat transfer between the connectors 1510, 1520, especially when both of the connectors 1510, 1520 are constructed of thermally conductive materials, such as metals. The thermal break plate 1530 may be unnecessary if one or both of the connectors 1510, 1520 is constructed of a more insulating material, such as a composite material.

According to another exemplary embodiment of the present disclosure, the composite sidewall 160 may be internally and/or externally strengthened at or near the opening 1501 to support the connectors 1510, 1520 and the side door. In the illustrated embodiment of FIGS. 22-24, the composite sidewall 160 includes a rear vertical support beam or cross-tie 1544 positioned near the rear vertical edge 1504, and a front vertical support beam or cross-tie 1546 positioned near the front vertical edge 1506. More specifically, the vertical support beams 1544, 1546 are positioned between the terminal ends 1516, 1526 of the connectors 1510, 1520 to accommodate forces from the connectors 1510, 1520 and the side door. The vertical support beams 1544, 1546 may be composite structures that are relatively narrow compared to the relatively wide panels 1550 that form the rest of the composite sidewall 160 and/or reinforced for additional strength, as discussed in Section 2 above. The illustrative vertical support beams 1544, 1546 are elongate structures that extend vertically along the height of vehicle 100 from the composite floor 140 to the composite roof 150. Also, the illustrative support beams 1544, 1546 are generally C-shaped in cross-section. However, the size and shape of the support beams 1544, 1546 may vary. For example, rather than being C-shaped in cross-section, the support beams 1544, 1546 may be square, rectangular, or circular in cross-section. It is also within the scope of the present disclosure to include other support beams in composite sidewall 160, such as a horizontal support beam or header (not shown) near the horizontal edge 1508 and/or additional vertical support beams.

16. Connection Between Composite Nose and a Thermal Control Unit

Figure 25:
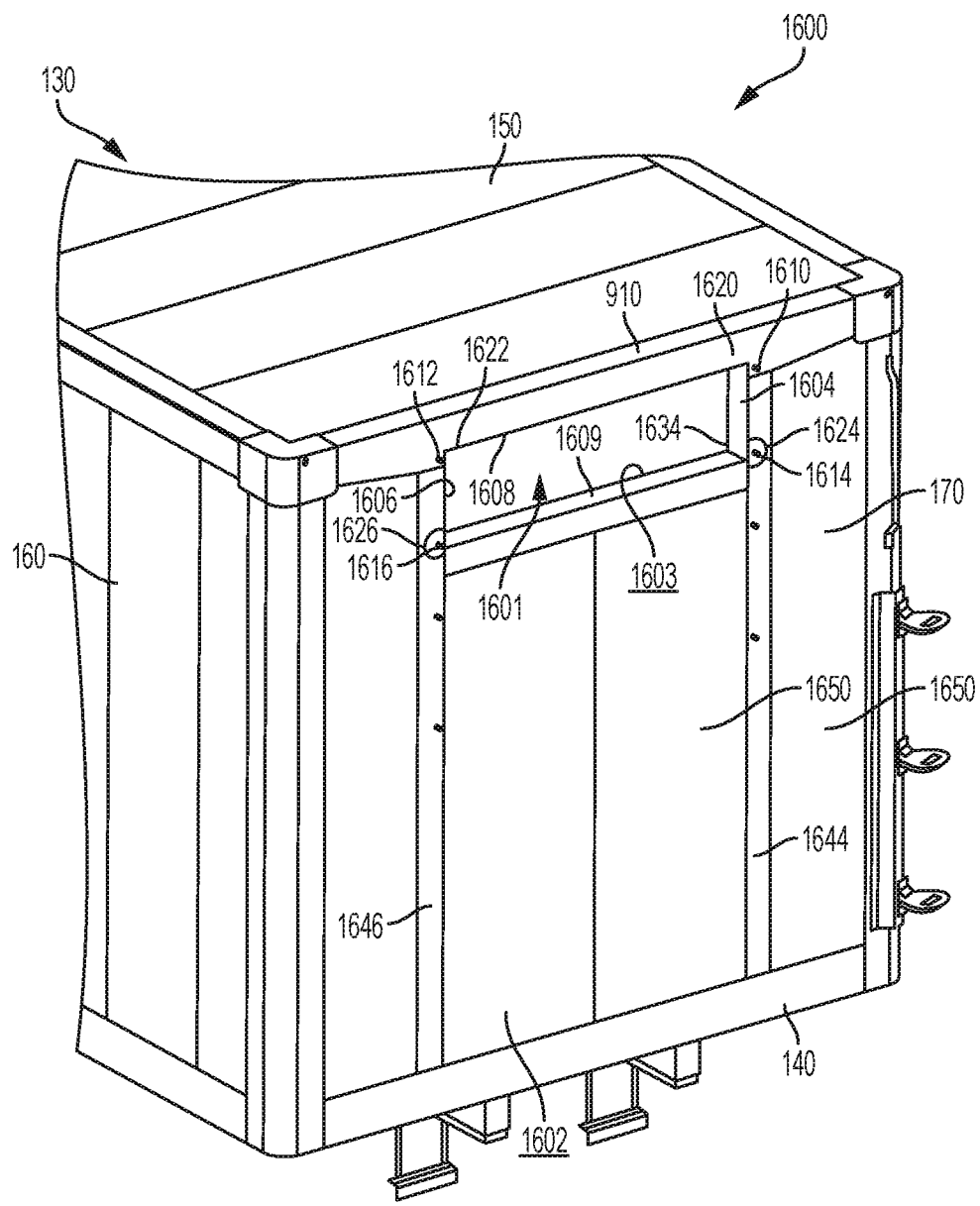
FIG. 25 is a perspective view of a connection between the nose and a thermal control unit.
Figure 26:
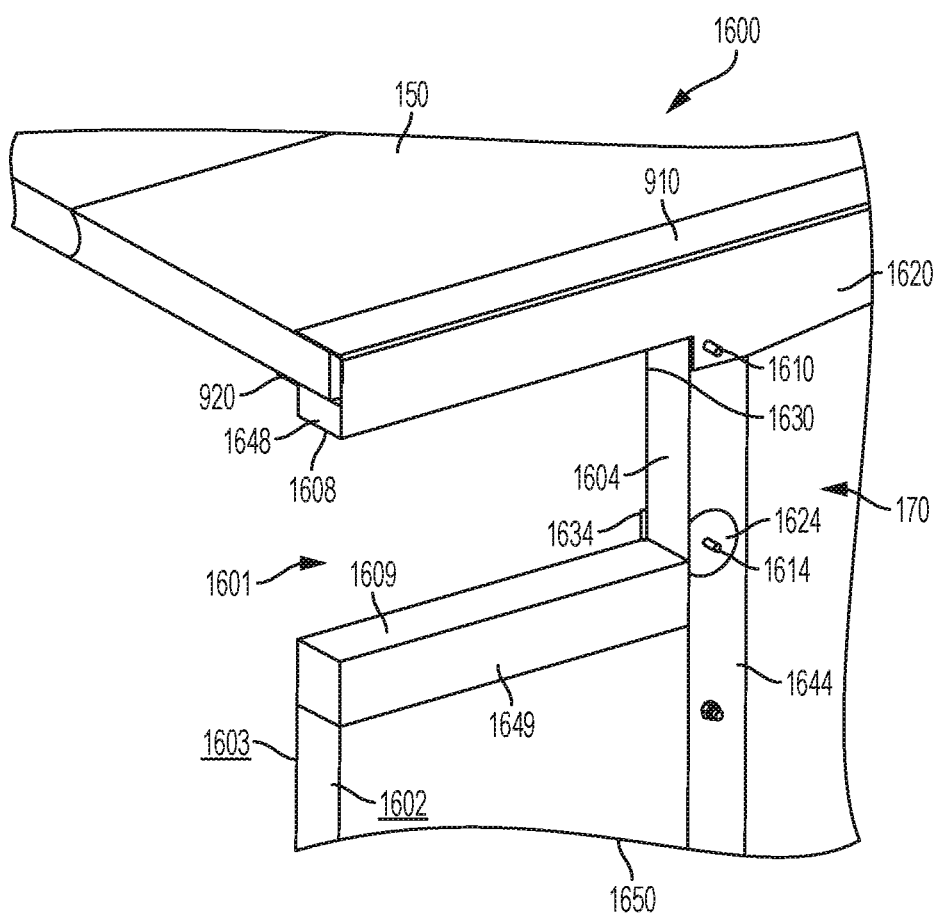
FIG. 26 is a vertical cross-sectional view through the connection of FIG. 25.
Figure 27:
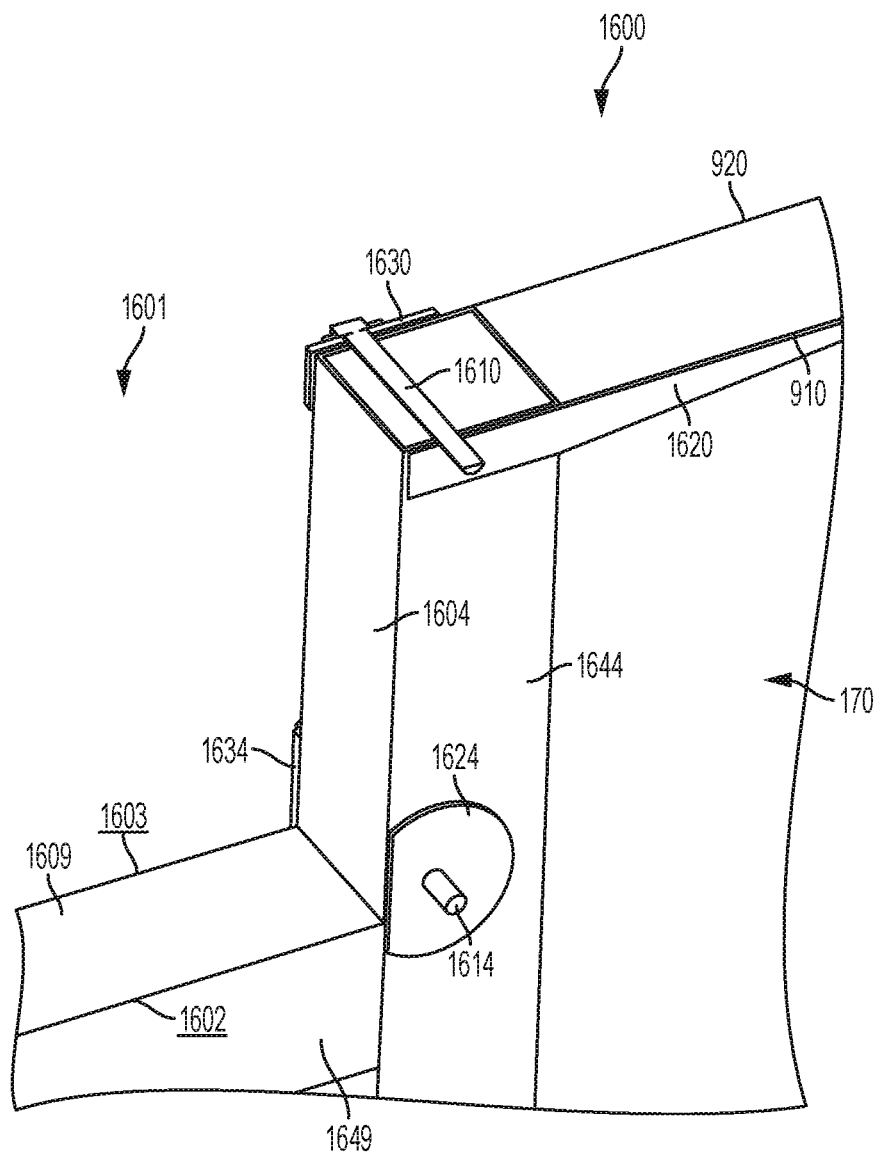
FIG. 27 is a horizontal cross-sectional view through the connection of FIG. 25.

Referring next to FIGS. 25-27, a connection 1600 is shown between the composite nose 170 and a thermal control unit (e.g., refrigeration unit) (not shown). The composite nose 170 includes a rectangular opening 1601 that extends through the composite nose 170 from an exterior surface 1602 to an interior surface 1603 to receive the thermal control unit. Between the exterior surface 1602 and the interior surface 1603, the opening 1601 is defined by a left vertical edge 1604, a right vertical edge 1606, an upper horizontal edge 1608, and a lower horizontal edge 1609 of the composite nose 170. The opening 1601 may be formed in the composite nose 170 during the process of molding the composite nose 170 or after the process of molding the composite nose 170, such as by cutting the opening 1601 into the composite nose 170. In the event that one or more of the edges 1604, 1606, 1608, 1609 is a raw foam rather than a fiberglass and/or polymer skin, the edges 1604, 1606, 1608, 1609 may be coated or treated to minimize water penetration and air leaks.

The connection 1600 may include a plurality of mechanical fasteners (e.g., bolts), illustratively two upper mechanical fasteners 1610, 1612 and two lower mechanical fasteners 1614, 1616. In FIG. 27, the fasteners 1610, 1612, 1614, 1616 protrude from the exterior surface 1602 of the composite nose 170 to engage the thermal control unit and also protrude from the interior surface 1603 of the composite nose 170. It is also within the scope of the present disclosure that the fasteners 1610, 1612, 1614, 1616 may avoid extending through the exterior surface 1602 and/or the interior surface 1603 of the composite nose 170.

To distribute loads from the fasteners 1610, 1612, 1614, 1616 across the composite nose 170, each fastener 1610, 1612, 1614, 1616 may be associated with a corresponding exterior connector 1620, 1622, 1624, 1626 positioned outside of the cargo body 130 and/or a corresponding interior connector 1630, 1632, 1634, 1636 positioned inside of the cargo body 130. In certain embodiments, the exterior connectors 1620, 1622, 1624, 1626 and/or the interior connectors 1630, 1632, 1634, 1636 may define holes for receiving the corresponding fasteners 1610, 1612, 1614, 1616. In other embodiments, the exterior connectors 1620, 1622, 1624, 1626 and/or the interior connectors 1630, 1632, 1634, 1636 may be permanently coupled to the corresponding fasteners 1610, 1612, 1614, 1616. With respect to the lower fasteners 1614, 1616, the illustrative exterior connectors 1624, 1626, and the illustrative interior connectors 1634, 1636 are flat plates, each having a hole for receiving the corresponding lower fastener 1614, 1616. With respect to the upper fasteners 1610, 1612, the illustrative exterior connectors 1620, 1622 are part of the exterior connector 910 between the composite nose 170 and the composite roof 150, and the illustrative interior connectors 1630, 1632 are part of the interior connector 920 between the composite nose 170 and the composite roof 150, each having a hole for receiving the corresponding upper fastener 1610, 1612. In this manner, the connection 1600 may take advantage of the connection 900 between the composite nose 170 and the composite roof 150 (FIG. 9). However, as discussed in Section 4 above, the exterior connectors 1620, 1622, 1624, 1626 and the interior connectors 1630, 1632, 1634, 1636 may vary in size and shape.

To assemble the connection 1600, the exterior connectors 1620, 1622, 1624, 1626 may be adhesively bonded to the exterior surface 1602 of the composite nose 170 using adhesive 300. Similarly, the interior connectors 1630, 1632, 1634, 1636 may be adhesively bonded to the interior surface 1603 of the composite nose 170 using adhesive 300. It is also within the scope of the present disclosure for the exterior connectors 1620, 1622, 1624, 1626 and/or the interior connectors 1630, 1632, 1634, 1636 to be mechanically fastened to the composite nose 170. Then, the fasteners 1610, 1612, 1614, 1616 may be coupled to the composite nose 170. For example, the fasteners 1610, 1612, 1614, 1616 may be inserted through the holes in the interior connectors 1630, 1632, 1634, 1636, through the composite nose 170, and through the holes in the exterior connectors 1620, 1622, 1624, 1626. With the fasteners 1610, 1612, 1614, 1616 protruding from the exterior surface 1602 of the composite nose 170, the thermal control unit (not shown) may be coupled to the fasteners 1610, 1612, 1614, 1616.

According to an exemplary embodiment of the present disclosure, the composite nose 170 may be internally and/or externally strengthened at or near the opening 1601 to support the fasteners 1610, 1612, 1614, 1616, the exterior connectors 1620, 1622, 1624, 1626, the interior connectors 1630, 1632, 1634, 1636, and the thermal control unit. In the illustrated embodiment of FIGS. 25-27, the composite nose 170 includes a left vertical support beam or cross-tie 1644 positioned at the left vertical edge 1604, a right vertical support beam or cross-tie 1646 positioned at the right vertical edge 1606, an upper horizontal support beam or header 1648 positioned at the upper horizontal edge 1608, and a lower horizontal support beam 1649 positioned at the lower horizontal edge 1609. The support beams 1644, 1646, 1648, 1649 may be composite structures that are relatively narrow compared to the relatively wide panels 1650 that form the rest of the composite nose 170 and/or reinforced for additional strength, as discussed in Section 2 above. In certain embodiments, the reinforcements may be limited to the locations of the fasteners 1610, 1612, 1614, 1616, the exterior connectors 1620, 1622, 1624, 1626, and the interior connectors 1630, 1632, 1634, 1636. These reinforcements may help prevent the composite nose 170 from crushing when hardware is tightened in place and may help distribute loads to other areas of the vehicle 100.

The illustrative support beams 1644, 1646, 1648, 1649 are generally square in cross-section. However, the size and shape of the support beams 1644, 1646, 1648, 1649 may vary. For example, rather than being square in cross-section, the support beams 1644, 1646, 1648, 1649 may be rectangular, circular, or C-shaped in cross-section. It is also within the scope of the present disclosure to include other support beams in the composite nose 170.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A cargo body for a vehicle, the cargo body comprising:
a floor having a front end, a rear end, and a longitudinal axis that extends from the front end to the rear end, the floor being made from a fiber-reinforced plastic;
a right sidewall coupled to the floor;
a left sidewall coupled to the floor;
a nose coupled to the front end of the floor;
a roof coupled to the right sidewall, the left sidewall, and the nose;
a rear door assembly including a rear frame;
an L-shaped connector having a horizontal portion adhered to the rear end of the floor and a vertical portion mechanically fastened to the rear frame; and
a thermal insulator positioned between the rear frame and a metal component of the floor.

2. The cargo body of claim 1, further comprising a plurality of mechanical fasteners that couple the floor to the rear door assembly.

3. The cargo body of claim 2, wherein each of the plurality of mechanical fasteners extends parallel to the longitudinal axis.

4. The cargo body of claim 1, wherein:
the vertical portion of the L-shaped connector includes a plurality of holes; and
the rear frame includes a plurality of holes aligned with the plurality of holes in the L-shaped connector.

5. The cargo body of claim 1, wherein the floor includes a vertical portion sandwiched between the L-shaped connector and the rear frame.

6. The cargo body of claim 1, wherein the L-shaped connector is located within a recess in the rear end of the floor.

7. The cargo body of claim 6, further comprising a plurality of mechanical fasteners that couple the floor to the rear door assembly, the plurality of mechanical fasteners located between a top surface and a bottom surface of the floor.

8. The cargo body of claim 1, further comprising an upper connector spanning across an upper surface of the floor and the rear frame.

9. The cargo body of claim 8, wherein the upper connector has a slip-resistant surface.

10. The cargo body of claim 1, wherein the floor includes an extruded preform assembly with a foam core, a plurality of fiberglass layers, and a cured resin.

11. The cargo body of claim 10, wherein the cured resin is a thermoset resin.

12. A cargo body for a vehicle, the cargo body comprising:
a floor having an upper surface, a lower surface, a front end, a rear end, and a longitudinal axis that extends from the front end to the rear end, the floor being made from a fiber-reinforced plastic;
a right sidewall coupled to the floor;
a left sidewall coupled to the floor;
a nose coupled to the front end of the floor;
a roof coupled to the right sidewall, the left sidewall, and the nose;
a rear door assembly including a rear frame; and
a connector coupled to the floor and the rear frame, the connector positioned within a recess of the floor between the upper surface and the lower surface of the floor, the recess being open at the lower surface of the floor.

13. The cargo body of claim 12, wherein the connector is L-shaped and has a horizontal portion adhered to the rear end of the floor and a vertical portion mechanically fastened to the rear frame.

14. The cargo body of claim 13, further comprising a plurality of mechanical fasteners coupling the vertical portion of the connector to the rear frame, wherein each of the plurality of mechanical fasteners extends parallel to the longitudinal axis.

15. The cargo body of claim 13, wherein the floor includes a vertical portion sandwiched between the vertical portion of the connector and the rear frame.

16. The cargo body of claim 12, further comprising a plurality of mechanical fasteners coupling the connector to the rear frame, wherein each of the plurality of mechanical fasteners is located between the upper surface and the lower surface of the floor.

17. The cargo body of claim 12, wherein the floor includes:
a right longitudinal support beam coupled to a right chassis rail; and
a left longitudinal support beam coupled to a left chassis rail.

18. The cargo body of claim 12, wherein the floor includes an extruded preform assembly with a foam core, a plurality of fiberglass layers, and a cured resin.

19. The cargo body of claim 18, wherein the cured resin is a thermoset resin.

20. A cargo body for a vehicle, the cargo body comprising:
a floor having a front end, a rear end, and a longitudinal axis that extends from the front end to the rear end, the floor being made from a fiber-reinforced plastic and including an extruded preform assembly with a foam core, a plurality of fiberglass layers, and a cured resin;
a right sidewall coupled to the floor;
a left sidewall coupled to the floor;
a nose coupled to the front end of the floor;
a roof coupled to the right sidewall, the left sidewall, and the nose;
a rear door assembly including a rear frame; and
a connector extending transversely relative to the longitudinal axis, the connector having a first portion adhered to the rear end of the floor and a second portion mechanically fastened to the rear frame, the second portion being angled relative to the first portion.

* * * * *